United States Patent
Park et al.

(10) Patent No.: US 9,946,345 B2
(45) Date of Patent: Apr. 17, 2018

(54) PORTABLE TERMINAL AND METHOD FOR PROVIDING HAPTIC EFFECT TO INPUT UNIT

(71) Applicant: Samsung Electronics Co., Ltd., Gyeonggi-do (KR)

(72) Inventors: Jin-Hyoung Park, Gangwon-do (KR); Ju-Youn Lee, Gyeonggi-do (KR); Sang-Hyup Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 70 days.

(21) Appl. No.: 14/156,082

(22) Filed: Jan. 15, 2014

(65) Prior Publication Data
US 2014/0198069 A1    Jul. 17, 2014

(30) Foreign Application Priority Data
Jan. 17, 2013    (KR) .......... 10-2013-0005429

(51) Int. Cl.
  *G06F 3/01*    (2006.01)
  *G06F 3/0354*  (2013.01)
(52) U.S. Cl.
  CPC .......... *G06F 3/016* (2013.01); *G06F 3/03545* (2013.01)
(58) Field of Classification Search
  CPC .................................................... G06F 3/016
  See application file for complete search history.

(56) References Cited

U.S. PATENT DOCUMENTS

| | | | |
|---|---|---|---|
| 2005/0243072 A1 | 11/2005 | Denoue et al. | |
| 2007/0008294 A1* | 1/2007 | Huang | G06F 1/3203 345/173 |
| 2007/0146343 A1 | 6/2007 | Prados | |
| 2008/0198139 A1 | 8/2008 | Lacroix et al. | |
| 2009/0079703 A1 | 3/2009 | Kyung et al. | |
| 2009/0236153 A1 | 9/2009 | Kyung et al. | |
| 2010/0137026 A1 | 6/2010 | Kim et al. | |
| 2010/0188327 A1 | 7/2010 | Frid et al. | |
| 2010/0188371 A1 | 7/2010 | Lowles et al. | |

(Continued)

FOREIGN PATENT DOCUMENTS

| | | |
|---|---|---|
| CN | 102301415 A | 12/2011 |
| EP | 2 194 444 | 6/2010 |

(Continued)

OTHER PUBLICATIONS

Muller, Alexander et al., Reflective Haptics: Resistive . . . , Proceedings of the 2010 Conference on New Interfaces for Musical Expression (NIME 2010), Syndney, Australia, pp. 2.

(Continued)

*Primary Examiner* — Charles Hicks
(74) *Attorney, Agent, or Firm* — The Farrell Law Firm, P.C.

(57) ABSTRACT

A portable terminal and a method for providing a haptic effect to an input unit are provided. The method includes displaying at least one object on a touch screen, detecting a touch input by the input unit with respect to the object displayed on the touch screen, determining a preset mode based on the detected touch input of the input unit, and transmitting a control signal corresponding to a predetermined haptic pattern based on the preset mode to the input unit.

31 Claims, 22 Drawing Sheets
(6 of 22 Drawing Sheet(s) Filed in Color)

(56) References Cited

U.S. PATENT DOCUMENTS

| | | | |
|---|---|---|---|
| 2011/0267182 A1* | 11/2011 | Westerinen et al. | 340/407.2 |
| 2012/0293464 A1* | 11/2012 | Adhikari | 345/179 |
| 2013/0257793 A1* | 10/2013 | Zeliff et al. | 345/174 |
| 2013/0271433 A1 | 10/2013 | Kyung et al. | |
| 2013/0321358 A1 | 12/2013 | Park et al. | |

FOREIGN PATENT DOCUMENTS

| | | |
|---|---|---|
| EP | 2 530 574 | 12/2012 |
| KR | 100769980 | 10/2007 |
| KR | 1020130136186 | 12/2013 |
| RU | 2 461 865 | 9/2012 |

OTHER PUBLICATIONS

Johnny C. Lee et al., "Haptic Pen: Tactile Feedback Stylus for Touch Screens", Internet Citation, Oct. 31, 2004, 5 pages.
European Search Report dated Sep. 5, 2016 issued in counterpart application No. 14740416.4-1959, 11 pages.
Chinese Office Action dated Dec. 15, 2016 issued in counterpart application No. 201480005236.2, 27 pages.
Russian Office Action dated Jan. 22, 2018 issued in counterpart application No. 2015134189/08, 14 pages.

\* cited by examiner

PORTABLE TERMINAL AND METHOD FOR PROVIDING HAPTIC EFFECT TO INPUT UNIT

PRIORITY

This application claims priority under 35 U.S.C. § 119(a) to a Korean patent application filed on Jan. 17, 2013 in the Korean Intellectual Property Office and assigned Serial No. 10-2013-0005429, the entire content of which is incorporated hereby by reference.

BACKGROUND OF THE INVENTION

1. Field of the Invention

The present invention relates generally to a portable terminal, and more particularly, to a portable terminal and method for providing a haptic effect to an input unit.

2. Description of the Related Art

Portable terminals continue to provide an increasing number of services and additional functions to users. To increase the utilization of portable terminals and satisfy various users' demands, many applications have been developed for use in portable terminals.

Along with this trend, many applications can be installed in a portable terminal that has a touch screen, such as a smart phone, mobile phone, note PC and a tablet Personal Computer (PC). Objects (or shortcut icons) representing applications are displayed on a touch screen of the portable terminal, so that a user may execute an intended application by touching an associated shortcut icon on the touch screen. Besides the shortcut icons, many other visual objects including widgets, photos, and text are displayed on the touch screen of the portable terminal.

The portable terminal allows a user's touch input on a displayed object through an input unit such as a finger, an electronic pen, a stylus pen, etc. The touch input may be applied through a contact input by touching the touch screen with a part of the user's body (or any other touch input unit) or by providing touch input in a non-contact manner by holding (hovering) a part of the user's body (or another input unit) above the touch screen. This touch input scheme provides a user-friendly User Interface (UI).

Recently, methods of generating vibrations upon input of a touch on a touch screen through a vibration device have been proposed, in order to give a user a sense of manipulation similar to that provided when a physical button were pressed. Such various touch input schemes are actively being studied, and research is also conducted in order to determine ways to satisfy users' demands for new, pleasant multi-sense interfaces.

According to previously-existing methods, when a user manipulates a portable terminal, vibrations are provided to an input unit through a touch screen, in order to give the user a sense of manipulation, as described above. Although this touch input scheme enables the user to feel contact between the input unit and the touch screen, this scheme has limitations in transferring an actual feeling of using an application to the user. Accordingly, there exists a need for providing an advanced UI input unit that goes beyond its simple role of selecting an object on a touch screen in order to keep up with increased expectations of users regarding touch inputs.

The above information is presented as background information only to assist with an understanding of embodiments of the present invention. No determination has been made, and no assertion is made, as to whether any of the above might be applicable as prior art with regard to the present invention.

SUMMARY OF THE INVENTION

Aspects of the present invention are provided to address at least the above-mentioned problems and/or disadvantages and to provide at least the advantages described below. Accordingly, an aspect of the present invention is to provide a portable terminal having at least one touch screen and method for providing a haptic effect to an input unit, when a user manipulates a User Interface (UI) in the portable terminal.

In accordance with an aspect of the present invention, a method for controlling a haptic effect of an input unit is provided. The method includes displaying at least one object on a touch screen, detecting a touch input by the input unit with respect to the object displayed on the touch screen, determining a preset mode based on the detected touch input of the input unit, and transmitting, to the input unit, a control signal corresponding to a predetermined haptic pattern based on the preset mode.

In accordance with another aspect of the present invention, a portable terminal for controlling a haptic effect of an input unit is provided. The portable terminal includes a touch screen configured to display at least one object, a controller configured to determine a preset mode based on a touch input by the input unit with respect to the object displayed on the touch screen and to generate a control signal corresponding to a predetermined haptic pattern based on the preset mode, and a transceiver configured to transmit the generated control signal to the input unit.

In accordance with another aspect of the present invention, a method for providing a haptic effect is provided. The method includes storing different haptic patterns to provide a haptic effect to at least one of a portable terminal and an input unit according to movement of the input unit, determining a preset mode based on a touch input by the input unit with respect to an object displayed on a touch screen, and generating vibrations according to a predetermined haptic pattern corresponding to the preset mode.

In accordance with another aspect of the present invention, an input unit for providing a haptic effect is provided. The input unit includes a vibration device, a short-range communication module configured to receive, from a portable terminal, a control signal corresponding to a predetermined haptic pattern based on movement of the input unit with respect to an object displayed on a touch screen of a portable terminal, and a haptic controller configured to control the vibration device to vibrate according to the predetermined haptic pattern by analyzing the control signal. The control signal controls at least one of activation, deactivation, a vibration cycle, and a vibration strength of the vibration device.

In accordance with another aspect of the present invention, a method for providing a haptic effect in an input unit is provided. The method includes receiving, from a portable terminal, a control signal corresponding to a predetermined haptic pattern based on movement of the input unit with respect to an object displayed on a touch screen of the portable terminal, and controlling a vibration device to vibrate according to the predetermined haptic pattern by analyzing the control signal. The control signal controls at least one of activation, deactivation, a vibration cycle, and a vibration strength of the vibration device.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other aspects, features, and advantages of certain embodiments of the present invention will be more apparent from the following description taken in conjunction with the accompanying drawings, in which.

DETAILED DESCRIPTION OF EMBODIMENTS OF THE PRESENT INVENTION

Figure 1:
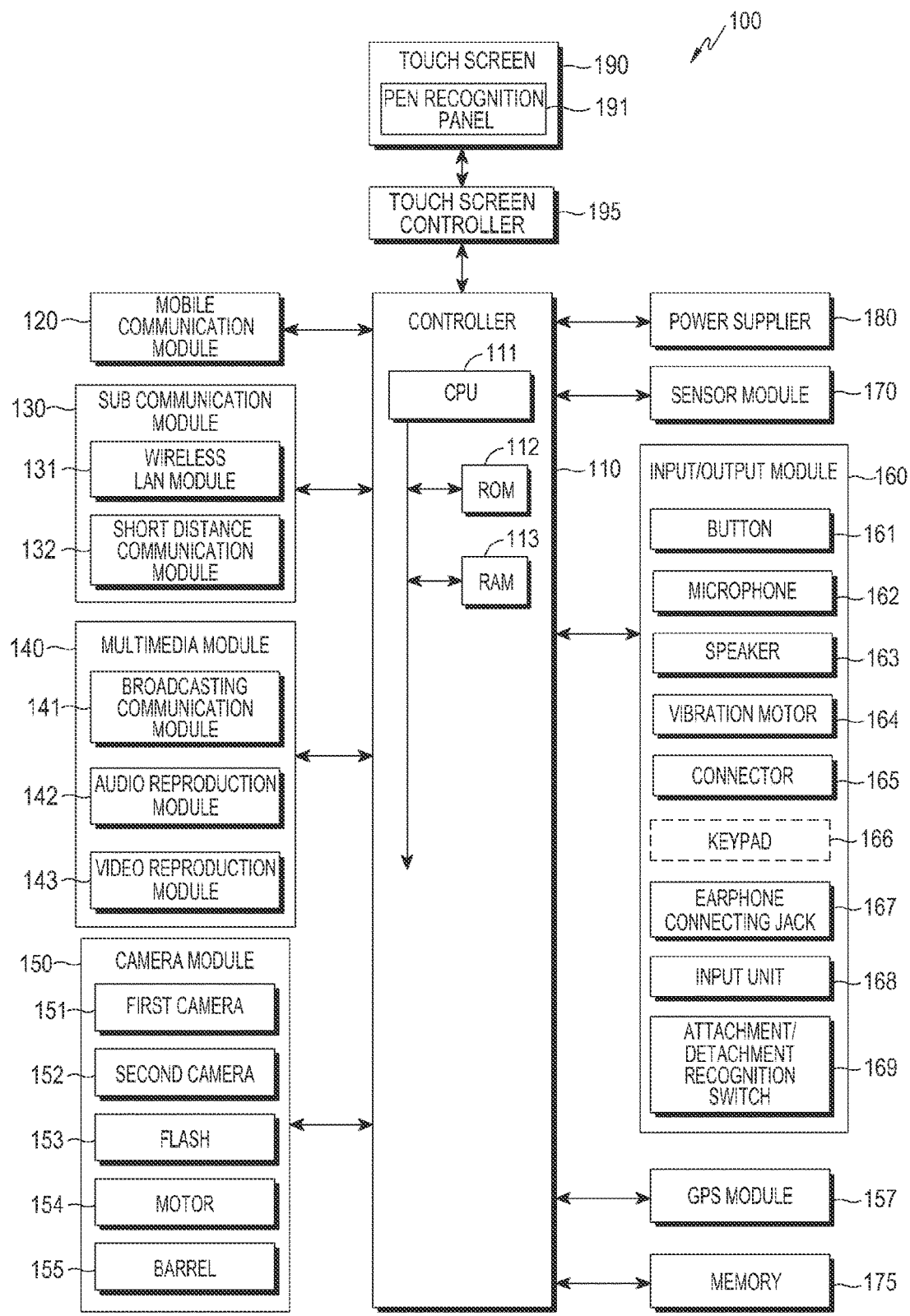
FIG. 1 is a block diagram of a portable terminal of providing a haptic effect according to an embodiment of the present invention.

The following description with reference to the accompanying drawings is provided to assist in a comprehensive understanding of embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, the following description of embodiments of the present invention is provided for illustration purposes only and does not limit scope the invention as defined by the appended claims and their equivalents.

Herein, the singular forms "a," "an," and "the" include plural referents, unless the context clearly dictates otherwise. For example, reference to "a component surface" includes reference to one or more of such surfaces.

Herein, the term "substantially" indicates that a recited characteristic, parameter, or value need not be achieved exactly, but that deviations or variations, including for example, tolerances, measurement error, measurement accuracy limitations and other known factors, may occur in amounts that do not preclude the effect the characteristic was intended to provide.

Certain terms used herein are defined as follows.

Portable terminal: A portable terminal is a mobile terminal having portability, with which a user can transmit and receive data and conduct voice and video calls. The portable terminal may have one or more touch screens. A portable terminal may be any of a smart phone, a tablet Personal Computer (PC), a Three-Dimensional (3D) TeleVision (TV), a smart TV, a Light Emitting Diode (LED) TV, a Liquid Crystal Display (LCD) TV, etc. The portable terminal may also be a terminal that can communicate with a peripheral device or another remote terminal.

Input Unit: An input unit is at least one of a finger (or another user's body part), an electronic pen, and a stylus pen, which can apply a command or an input to a portable terminal in a contact manner by contacting a touch screen or in a non-contact manner like hovering.

Object: Herein, the term "object" refers to an object displayable on a touch screen of a portable terminal. An object may include any of text, a widget, a photo, a video, an e-mail, a Short Message Service (SMS) message, and a Multimedia Messaging Service (MMS) message. The object can be executed, deleted, canceled, stored, and changed by an input unit. The term 'object' may cover a shortcut icon, a thumbnail image, and a folder that stores at least one object in a portable terminal.

Shortcut icon: a shortcut icon is displayed on a touch screen of a portable terminal to quickly execute each application or basic functions such as a call, contacts, a menu, and the like in a portable terminal. When a command or input is received for a shortcut icon, an application corresponding to the shortcut icon is executed.

FIG. 1 is a block diagram of a portable terminal that provides a haptic effect according to an embodiment of the present invention.

Referring to FIG. 1, a portable terminal 100 may be connected to an external device (not shown) through at least one of a mobile communication module 120, a sub-communication module 130, a connector 165, and an earphone connector jack 167. The external device may include any of a variety of devices that can be detachably connected to the portable terminal 100 by wire, such as an earphone, an external speaker, a Universal Serial Bus (USB) memory, a charger, a cradle, a docking station, a Digital Multimedia Broadcasting (DMB) antenna, a mobile payment device, a health care device (e.g., a blood sugar meter, etc.), a game console, a vehicle navigation device, etc. The external device may also include a device wirelessly connectable to the portable terminal 100, such as a Bluetooth communication device, a Near Field Communication (NFC) device, a Wireless Fidelity (Wi-Fi) Direct communication device, a wireless Access Point (AP), or the like. The portable terminal 100 may be connected to another terminal by wire or wirelessly, such as a portable phone, a smart phone, a tablet PC, a desktop PC, or a server.

The portable terminal 100 includes at least one touch screen 190 and at least one touch screen controller 195. The portable terminal 100 further includes a controller 110, the mobile communication module 120, the sub-communication module 130, a multimedia module 140, a camera module 150, a Global Positioning System (GPS) module 157, an Input/Output (I/O) module 160, a sensor module 170, a memory (storage) 175, and a power supply 180.

The sub-communication module 130 includes at least one of a Wireless Local Area Network (WLAN) module 131 and a short-range communication module 132. The multimedia module 140 includes at least one of a broadcasting communication module 141, an audio play module 142 and a video play module 143. The camera module 150 includes at least one of a first camera 151 and a second camera 152. According to an embodiment of the present invention, the camera module 150 also includes at least one of a barrel 155 to zoom in or zoom out an object during capturing the object by the first camera 151 and/or the second camera 152, a motor 154 to control movement of the barrel 155, for zoom-in or zoom-out, and a flash 153 to provide a light source required for capturing an image. The I/O module 160 may include at least one of buttons 161, a microphone 162, a speaker 163, a vibration motor 164, the connector 165, and a keypad 166.

The controller 110 includes a Central Processing Unit (CPU) 111, a Read Only Memory (ROM) 112 that stores a control program to control the portable terminal 100, and a Random Access Memory (RAM) 113 that stores signals or data received from the outside of the portable terminal 100 or for use as a memory space for an operation performed by the portable terminal 100. The CPU 111 may include one or more cores. The CPU 111, the ROM 112, and the RAM 113 may be connected to one another through an internal bus.

The controller 110 controls the mobile communication module 120, the sub-communication module 130, the multimedia module 140, the camera module 150, the GPS module 157, the I/O module 160, the sensor module 170, the memory 175, the power supply 180, the touch screen 190, and the touch screen controller 195.

While a plurality of objects are displayed on the touch screen 190, the controller 110 may sense a hovering input that is generated when the input unit 168, such as an electronic pen approaches an object from above, or a touch input that is generated when the input unit 168 touches the touch screen 190. The controller 110 then determines the distance of the input unit 168 above the portable terminal 100 and may sense a hovering input according to the distance. More specifically, the controller 110 senses a hovering input of the input unit 168 above the touch screen 190 or a touch input of the input unit 168 on the touch screen 190. According to an embodiment of the present invention, the hovering input and touch input of the input unit 168 are collectively referred to as input events.

Upon generation of an input event from the input unit 168, the controller 110 senses the input event and analyzes the input.

The controller 110 detects an event or movement of the input unit 168 on the touch screen 190, which displays at least one object, and generates a control signal corresponding to a predetermined haptic pattern. The control signal includes a signal that controls vibrations of the input unit 168 according to the haptic pattern. To control vibrations of the input unit 168 according to a haptic pattern, the portable terminal 100 pre-stores haptic patterns corresponding to instantaneous or continuous movements of the input unit 168. These haptic patterns differ for different modes to be applied to an object displayed on the touch screen 190. The modes may be preset, including at least one of a first mode of cutting a part of a displayed object, a second mode of drawing a contour around a displayed object, a third mode of controlling the portable terminal 100 according to a pattern input to the touch screen 190 by the input unit 168, and a fourth mode of applying a pen function to the input unit 168. Besides these modes, embodiments of the present invention are also applicable to a mode of controlling an object displayed on the touch screen 190 or an application and a mode of providing overall control to the portable terminal 100 such as execution and cancellation of a function.

The controller 110 senses movement of the input unit 168 until the end of its continuous movement on the touch screen 190, generates a control signal corresponding to a haptic pattern during the movement of the input unit 168, and transmits the control signal to the input unit 168. The input unit 168 analyzes a vibration cycle and a vibration duration corresponding to the haptic pattern indicated by the control signal and vibrates according to the vibration cycle and the vibration duration.

The mobile communication module 120 connects the portable terminal 100 to an external device through one or more antennas (not shown), via mobile communication, under the control of the controller 110. The mobile communication module 120 may transmit wireless signals to or may receive wireless signals from a device such as a portable phone (not shown), a smart phone (not shown), a tablet PC (not shown), or another electronic device (not shown) that has a phone number input to the portable terminal 100, in order to perform a service such as a voice call, a video call, a Short Message Service (SMS), or a Multimedia Messaging Service (MMS).

The sub-communication module 130 may include at least one of the WLAN module 131 and the short-range communication module 132. The WLAN module 131 may be connected to the Internet under the control of the controller 110 in a place where a wireless AP (not shown) is installed. The WLAN module 131 supports the WLAN standard, Institute of Electrical and Electronics Engineers (IEEE) 802.11x. The short-range communication module 132 may conduct short-range wireless communication between the portable terminal 100 and an image forming device (not shown) under the control of the controller 110. The short-range communication may conform to Bluetooth, Infrared Data Association (IrDA), Wi-Fi Direct, NFC, etc.

The controller 110 transmits a control signal corresponding to a haptic pattern to the input unit 168 through at least one of the WLAN module 131 and the short-range communication module 132 of the sub-communication module 130.

The portable terminal 100 includes at least one of the mobile communication module 120, the WLAN module 131, and the short-range communication module 132. Herein, either one or both of the mobile communication module 120, the WLAN module 131, and the short-range communication module 132 may be referred to as a transceiver. However, a transceiver according to embodiments of the present invention is not limited to this configuration.

The multimedia module 140 includes at least one of the broadcasting communication module 141, the audio play module 142, or the video play module 143. The broadcasting communication module 141 receives a broadcast signal (e.g., a TV broadcast signal, a radio broadcast signal, or a data broadcast signal) and additional broadcasting information (e.g., an Electronic Program Guide (EPG) or Electronic Service Guide (ESG)) from a broadcasting station through a broadcasting communication antenna (not shown) under the control of the controller 110. The audio play module 142 opens a stored or received digital audio file (e.g., a file having such an extension as mp3, wma, ogg, or wav) under the control of the controller 110. The video play module 143 opens a stored or received digital video file (e.g., a file having an extension such as mpeg, mpg, mp4, avi, mov, or mkv) under the control of the controller 110. The video play module 143 may also open a digital audio file. The audio play module 142 or the video play module 143 of the multimedia module 140 may be incorporated into the controller 110.

The camera module 150 includes at least one of the first camera 151 and the second camera 152 to capture a still image or a video under the control of the controller 110. The camera module 150 may also include at least one of the barrel 155 to zoom in or zoom out an object during capturing the object, the motor 154 to control movement of the barrel 155, and the flash 153 to provide an auxiliary light source required for capturing an object. The first camera 151 may be disposed on the front surface of the portable terminal 100, while the second camera 152 may be disposed on the rear surface of the device 100. As an alternative, the first camera 151 may be disposed close to the second camera 152 (e.g., a distance between the first and second cameras 151 and 152 may be between 1 cm and 8 cm), in order to capture a three-Dimensional (3D) still image or a 3D video.

Each of the first and second cameras 151 and 152 includes a lens system and an image sensor. Each of the first and second cameras 151 and 152 converts an optical signal incident on its lens system (or captured by the lens system) to an electrical image signal and outputs the electrical image signal to the controller 110. Thus, the user may capture a video or a still image by means of the first and second cameras 151 and 152.

The GPS module 157 receives signal waves from a plurality of GPS satellites (not shown) in Earth orbit and calculate a position of the portable terminal 100 based on the Time of Arrivals (ToAs) of satellite signals from the GPS satellites to the portable terminal 100.

The I/O module 160 includes at least one of the plurality of buttons 161, the microphone 162, the one speaker 163, the vibration motor 164, the connector 165, the keypad 166, the earphone connector jack 167, and the input unit 168. The I/O module 160 is not limited thereto and a cursor control such as a mouse, a track ball, a joystick, or cursor directional keys may be provided to control movement of a cursor on the touch screen 190.

The buttons 161 may be formed on the front surface, a side surface, or the rear surface of a housing of the portable terminal 100, and may include at least one of a power/lock button, a volume button, a menu button, a home button, a back button, and a search button.

The microphone 162 receives a voice or sound and may convert the received voice or sound to an electrical signal under the control of the controller 110.

The speaker 163 outputs to an exterior of the portable terminal 100, under a control of the controller 110, sound corresponding to a signal (e.g., a wireless signal, a broadcast signal, a digital audio file, a digital video file, or a photo shot) received from the mobile communication module 120, the sub-communication module 130, the multimedia module 140, or the camera module 150. The speaker 163 outputs sounds corresponding to a control signal to be transmitted to the input unit 168 through the short-range communication module 132. The sounds corresponding to the control signal includes a sound generated by activation of a vibration device 520 of the input unit 168, a sound having a variable volume according to a vibration strength, and a sound generated by deactivation of the vibration device 520 of the input unit 168. The volume of the sound may be controlled according to the vibration strength of the vibration device 520 of the input unit 168, or the sound may be output through the speaker 163 of the portable terminal 100 and/or a speaker 560 of the input unit 168 simultaneously with activation of the vibration device 520 or a predetermined time (e.g., 10 ms) before or after the activation of the vibration device 520. The sound may stop simultaneously with deactivation of the vibration device 520 or a predetermined time (e.g., 10 ms) before or after the deactivation of the vibration device 520. The speaker 163 may output sounds corresponding to functions (e.g., a button manipulation sound, a ringback tone, a voice from the other party in a call, etc.) performed by the portable terminal 100. One or more speakers 163 may be disposed at various positions of the housing of the portable terminal 100.

The vibration motor 164 converts an electrical signal to a mechanical vibration under the control of the controller 110. For example, when the portable terminal 100 receives an incoming voice call from another device (not shown) in a vibration mode, the vibration motor 164 operates. One or more vibration motors 164 may be mounted inside the housing of the portable terminal 100. The vibration motor 164 may also operate in response to continuous movement of a touch on the touch screen 190.

The connector 165 is used as an interface to connect the portable terminal 100 to an external electronic device (not shown) or a power source (not shown). The controller 110 may transmit data stored in the memory 175 to the external device or receive data from the external device via a cable connected to the connector 165. The portable terminal 100 may receive power or charge a battery (not shown) from the power source via the cable connected to the connector 165.

The keypad 166 receives key input from the user to control the portable terminal 100. The keypad 166 may include a physical keypad (not shown) formed in the portable terminal 100 or a virtual keypad (not shown) displayed on the touch screen 190. The physical keypad is not necessarily provided in the portable terminal 100, according to certain embodiments of the present invention.

An earphone (not shown) may be inserted into the earphone connector jack 167 in order to connect with the portable terminal 100. The input unit 168 may be inserted and stored in the portable terminal 100, and extended or removed from the portable terminal 100 for use. An insertion/removal sensing switch 169 is provided in an internal area of the portable terminal 100 into which the input unit 168 is inserted, in order to operate in response to insertion and removal of the input unit 168. The insertion/removal sensing switch 169 outputs signals corresponding to insertion and removal of the input unit 168 to the controller 110. The insertion/removal sensing switch 69 may be configured so as to directly or indirectly contact the input unit 168, when the input unit 168 is inserted. Therefore, the insertion/removal sensing switch 169 outputs, to the controller 110, a signal corresponding to insertion or removal of the input unit 168 determined according to whether the insertion/removal sensing switch 169 directly or indirectly contacts the input unit 168.

The sensor module 170 includes at least one sensor to detect a state of the portable terminal 100. For example, the sensor module 170 may include a proximity sensor that detects whether the user is close to the portable terminal 100, an illuminance sensor that detects the amount of ambient light around the portable terminal 100, a motion sensor that detects a motion of the portable terminal 100 (e.g., rotation, acceleration or vibration of the portable terminal 100), a geo-magnetic sensor that detects a point of the compass of the portable terminal 100 using the earth's magnetic field, a gravity sensor that detects the direction of gravity, and an altimeter that detects an altitude by measuring the air pressure. At least one sensor detects a state of the portable terminal 100, generates a signal corresponding to the detected state, and transmits the signal to the controller 110.

A sensor may be added to or omitted from the sensor module 170 in accordance with embodiments of the present invention.

The memory 175 stores input/output signals or data in accordance with operations of the mobile communication module 120, the sub-communication module 130, the multimedia module 140, the camera module 150, the GPS module 157, the I/O module 160, the sensor module 170, and the touch screen 190 under the control of the controller 110. The memory 175 also stores a control program to control the portable terminal 100 or the controller 110, and applications.

In addition, the memory 175 stores information about vibration strengths and vibration cycles for haptic patterns in order to provide various haptic effects to the portable terminal 100 or the input unit 168, when an instantaneous or continuous touch is made on the touch screen 190 by the input unit 168. The haptic patterns include a haptic pattern for paper cutting, a haptic pattern for pen type changing, a haptic pattern for handwriting by each pen, and a haptic pattern corresponding to a tactile feeling that may be experience by a user. Besides these haptic patterns, the present invention is applicable to many other haptic patterns that give haptic effects available through the input unit 168. The memory 175 also stores character sequences for menus or functions of a plurality of applications and haptic patterns that can execute each of the menus according to an initial sound, a middle sound, and a combination of them.

The term "memory" covers the memory 175, the ROM 112 and the RAM 113 within the controller 110, or a memory card (not shown) (e.g., a Secure Digital (SD) card or a memory stick) mounted to the portable terminal 100. The memory may include a non-volatile memory, a volatile memory, a Hard Disk Drive (HDD), or a Solid State Drive (SSD).

The memory 175 stores applications having various functions such as navigation, video call, game, and time-based alarm applications, images used to provide GUIs related to the applications, user information, text, databases or data related to a method of processing a touch input, background images (e.g., a menu screen, a waiting screen, etc.) or operation programs required to operate the terminal 100, and images captured by the camera module 150. The memory 175 is a machine-readable medium (e.g., a computer-readable medium). Herein, a machine-readable medium is defined as a medium that provides data to a machine, in order for the machine to perform a specific function. The memory 175 includes a volatile medium and a non-volatile medium. All these media are of a type that transfers commands detectable by a physical device that reads the commands to the machine.

Examples of a machine-readable medium include, but not are limited to, a floppy disk, a flexible disk, a hard disk, a magnetic tape, a Compact Disk Read Only Memory (CD-ROM), an optical disk, a punch card, a paper tape, a RAM, a Programmable ROM (PROM), an Erasable PROM (EPROM), and a Flash-EPROM.

The power supply 180 may supply power to one or more batteries mounted in the housing of the portable terminal 100 under the control of the controller 110. The one or more batteries supply power to the portable terminal 100. Further, the power supply 180 may also supply power received from an external power source via the cable connected to the connector 165 to the portable terminal 100. The power supply 180 may also supply power received wirelessly from the external power source to the portable terminal 100 via a wireless charging technology.

The portable terminal 100 includes the at least one touch screen 190 that provides User Interfaces (UIs) corresponding to various services (e.g., call, data transmission, broadcasting, photo shot, etc.). The touch screen 190 outputs, to the touch screen controller 195, an analog signal corresponding to at least one user input to a Graphical UI (GUI). The portable terminal 100 may have a plurality of touch screens and a plurality of touch screen controllers to receive analog signals corresponding to touches on the touch screens, respectively. Each touch screen may be engaged with a plurality of housings by hinge engagement. Alternatively, a plurality of touch screens may be mounted in a single housing without hinge engagement. According to an embodiment of the present invention, the portable terminal 100 may include at least one touch screen. The following description refers to examples wherein the portable terminal 100 includes one touch screen.

The touch screen 190 receives at least one user input through a user's body (e.g., a finger) or the input unit 168 (e.g., a stylus pen, an electronic pen, etc.). The touch screen 190 includes a pen recognition panel 191 to recognize a pen input of a stylus pen or an electronic pen on the touch screen 190. The pen recognition panel 191 detects the distance between the pen and the touch screen 190 based on a magnetic field. The touch screen 190 may receive continuous movement of a single touch, among one or more touches. The touch screen 190 may transmit an analog signal corresponding to the input continuous movement of the touch to the touch screen controller 195.

The touch may include a non-contact touch (e.g., a detectable gap between the touch screen 190 and the user's body part or a touch input means is about 5 mm), and accordingly is not limited to contacts between the touch screen 190 and the user's body part or the touch input means. The gap detectable to the touch screen 190 varies according to the capabilities or configuration of the portable terminal 100. Particularly, to distinguish a touch event generated by contact between a user's body or the touch input unit from a non-contact input event (e.g., a hovering event), the touch screen 190 may output different detection values (e.g., different analog voltage or current values) for the touch event and the hovering event. For example, the touch screen 190 may output a different detection value (e.g., a different current value) according to the distance between an area of a hovering event and the touch screen 190.

The touch screen 190 may be implemented as, for example, a resistive type, a capacitive type, an infrared type, an acoustic wave type, or in a combination thereof.

To receive an input of the user's body and an input of the touch input unit simultaneously or sequentially, the touch screen 190 includes at least two touch screen panels that sense touches or proximity of the user's body and the touch input unit, respectively. The at least two touch screen panels provide different output values to the touch screen controller 195, and the touch screen controller 195 determines whether an input from the touch screen 190 is an input of the user's body or an input of the touch input unit by distinguishing values received from the at least two touch screen panels.

Specifically, a panel to sense an input of a finger or the input unit 168 by a change in inducted power the touch screen 190 and a panel to sense contact of a finger or the input unit 168 on the touch screen 190 are brought into close contact or stacked, partially spaced from each other in the touch screen 190. The touch screen 190 has a large number of pixels to display an image. The touch screen 190 may be any of an LCD, an Organic Light Emitting Diode (OLED) display, an LED display, etc.

The touch screen 190 further includes a plurality of sensors that determine the position of a finger or the input unit 168 touching the touch screen 190 or spaced from the touch screen 190 by a predetermined distance. Each of the sensors may have a coil structure. In a sensor layer formed by the plurality of sensors, each sensor has a predetermined pattern and forms a plurality of electrode lines. Thus, when a finger or the input unit 168 touches the touch screen 190, a sensing signal having a changed waveform is generated due to the capacitance between the sensor layer and the input means. The touch screen 190 transmits the sensing signal to the controller 110. The distance between the input unit 168 and the touch screen 190 may be determined based on the strength of a magnetic field formed by a coil 510 of the input unit 168. An operation of setting a vibration strength according to an embodiment of the present invention is described later herein.

Meanwhile, the touch screen controller 195 converts an analog signal received from the touch screen 190 to a digital signal (e.g., a signal indicating X and Y coordinates) and transmits the digital signal to the controller 110. The controller 110 controls the touch screen 190 using the received digital signal. For example, the controller 110 may select or execute a shortcut icon (not shown) or an object displayed on the touch screen 190 in response to a touch event or a hovering event. The touch screen controller 195 may be incorporated into the controller 110.

Further, the touch screen controller 195 determines the distance between the area of a hovering event and the touch screen 190 by detecting an output value (e.g., a current value) of the touch screen 190, convert information about the distance to a digital signal (e.g., a Z coordinate), and transmit the digital signal to the controller 110.

Figure 2:
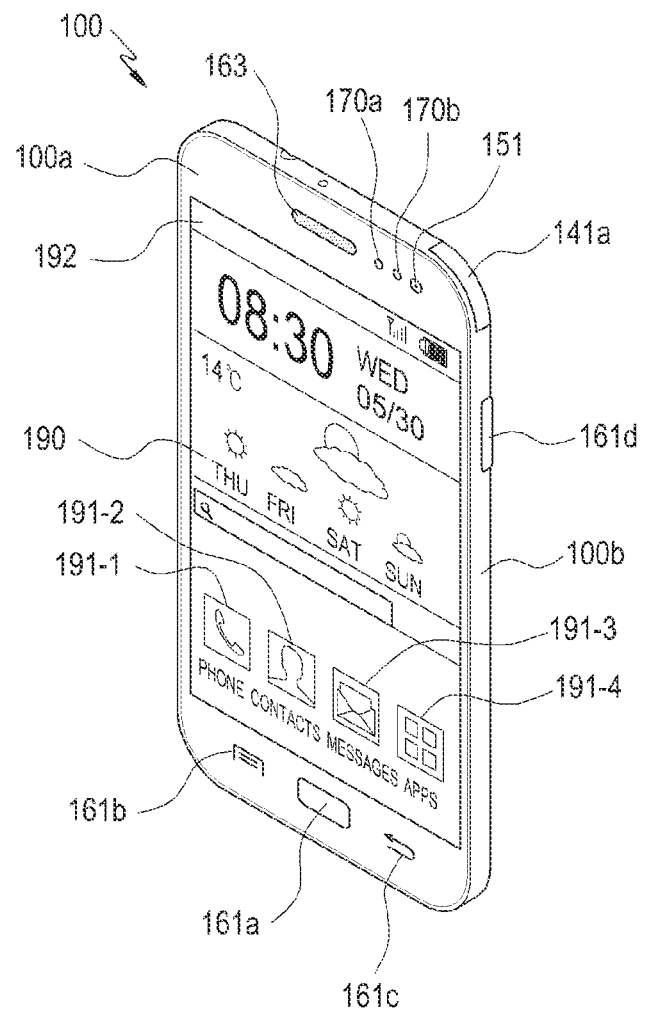
FIG. 2 is a front perspective view of a portable terminal according to an embodiment of the present invention.
Figure 3:
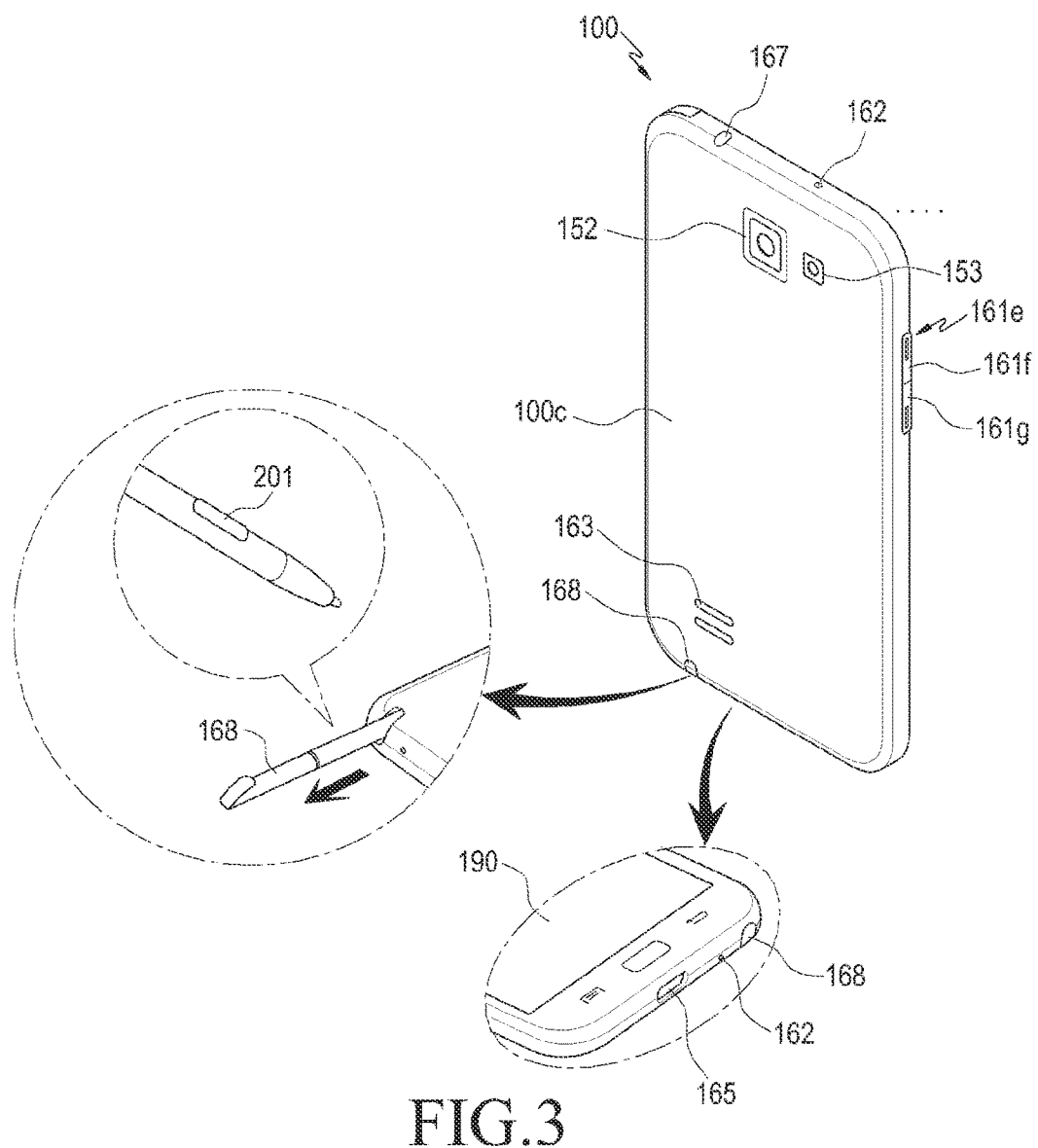
FIG. 3 is a rear perspective view of a portable terminal according to an embodiment of the present invention.

FIGS. 2 and 3 are front and rear perspective views, respectively, of a portable terminal according to an embodiment of the present invention.

Referring to FIGS. 2 and 3, the touch screen 190 is disposed at the center of the front surface 100a of the portable terminal 100, occupying almost the entirety of the front surface 100a. In FIG. 2, a main home screen is displayed on the touch screen 190, as an example. The main home screen is the first screen to be displayed on the touch screen 190, when the portable terminal 100 is powered on. When the portable terminal 100 has different home screens formed of a plurality of pages, the main home screen may be the first of the home screens of the plurality of pages. Shortcut icons 191-1, 191-2 and 191-3 are used to execute frequently-used applications. A main menu switch key 191-4, time, weather, and other information may also be displayed on the home screen. Upon a user selection of the main menu switch key 191-4, a menu screen is displayed on the touch screen 190. A status bar 192 is displayed at the top of the touch screen 190 in order to indicate states of the portable terminal 100, such as a battery charged state, a received signal strength, and a current time.

A home button 161a, a menu button 161b, and a back button 161c are formed at the bottom of the touch screen 190.

The home button 161a is used to display the main home screen on the touch screen 190. For example, upon selection of the home button 161a, while any home screen other than the main home screen or the menu screen is displayed on the touch screen 190, the main home screen may be displayed on the touch screen 190. Upon selection of the home button 161a during execution of applications on the home screen 190, the main home screen illustrated in FIG. 2 may be displayed on the touch screen 190. The home button 161a may also be used to display recently used applications or a task manager on the touch screen 190.

The menu button 161b provides link menus that can be displayed on the touch screen 190. The link menus may include a widget adding menu, a background changing menu, a search menu, an edit menu, an environment setting menu, etc.

The back button 161c is used to display a screen that was displayed prior to a currently-displayed screen or end the latest used application.

The first camera 151, an illuminance sensor 170a, and a proximity sensor 170b may be arranged at a corner of the front surface 100a of the portable terminal 100, whereas the second camera 152, the flash 153, and the speaker 163 may be arranged on the rear surface 100c of the portable terminal 100.

For example, a power/lock button 160a, a volume button 161b including a terrestrial DMB antenna 141a that receives a broadcast signal, and one or more microphones 162 may be disposed on side surfaces 100b of the portable terminal 100. The DMB antenna 141a may be mounted to the portable terminal 100 fixedly or detachably.

The connector 165 is formed on the bottom side surface of the portable terminal 100. The connector 165 may include a plurality of electrodes and may be connected to an external device by a wire. The earphone connector jack 167 may be formed on the top side surface of the portable terminal 100, in order to allow an earphone to be inserted.

The input unit 168 may be mounted to the bottom side surface of the portable terminal 100. The input unit 168 may be inserted and kept inside the portable terminal 100. When the input unit 168 is used, the input unit may be extended and removed from the portable terminal 100.

Figure 4:
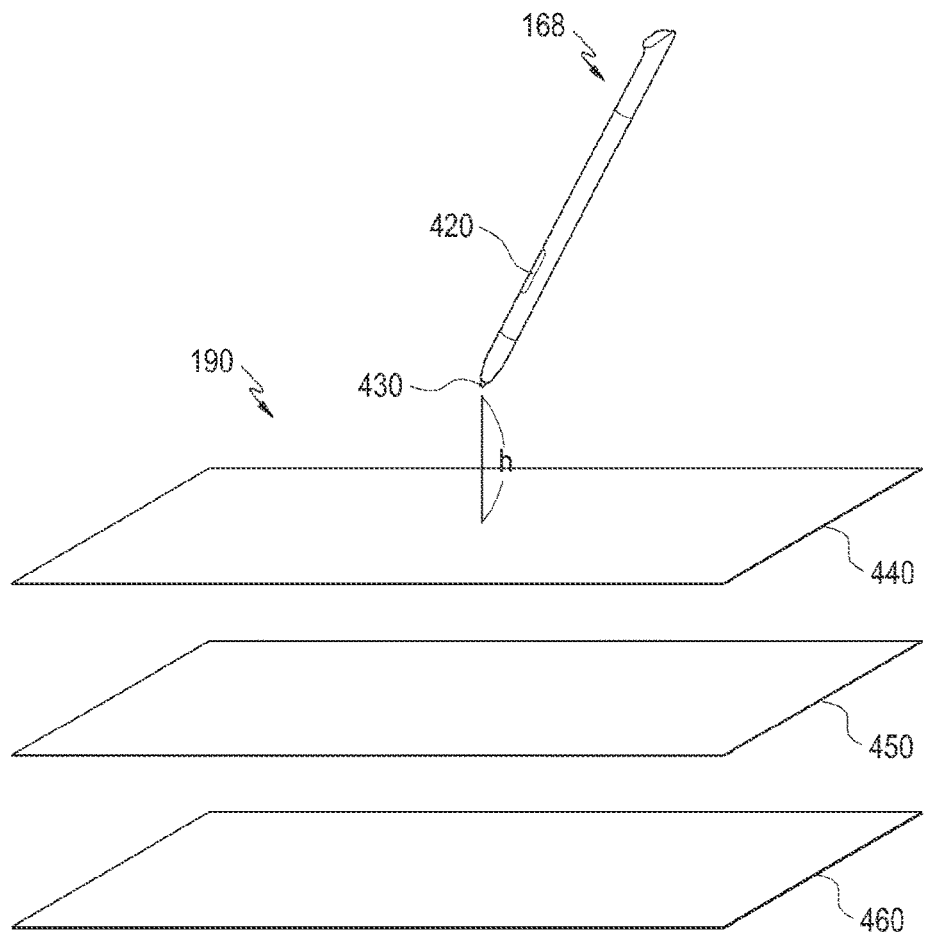
FIG. 4 is a diagram illustrating an input unit and internal sections of a touch screen according to an embodiment of the present invention.

FIG. 4 illustrates an input unit and internal sections of a touch screen according to an embodiment of the present invention.

Referring to FIG. 4, the touch screen 190 includes a first touch panel 440, a display panel 450, and a second touch panel 460. The display panel 450 may be an LCD panel, an Active Matrix Organic Light Emitting Diode (AMOLED) panel, or another such panel, which displays various images according to operation states of the portable terminal 100, application execution, and services, and displays a plurality of objects.

The first touch panel 440 is a capacitive-type panel formed by coating thin layers of a metal conductive material (e.g., Indium Tin Oxide (ITO) layers) onto both surfaces of a glass panel in order to provide a flow current on the layers and coating a dielectric material onto the first touch panel 440 in order to store capacitance. When an input unit (e.g., a user's finger or a pen) touches a surface of the first touch panel 440, a specific amount of charge migrates to a touched position, due to static electricity. The first touch panel 440 senses the touched position by recognizing a variation of current caused by the charge migration. The first touch panel 440 may sense any touch that can cause static electricity, and therefore the first touch panel 440 may also sense a touch of a finger or a pen as an input unit.

The second touch panel 460 is an Electronic Magnetic Resonance (EMR) type panel, which includes an electro-inductive coil sensor (not shown) having a grid structure in which a plurality of loop coils are arranged in a predetermined first direction and also arranged in a second direction perpendicular to the first direction. The second touch panel 460 further includes an electronic signal processor (not shown) that provides an Alternating Current (AC) signal having a predetermined frequency sequentially to each loop coil of the electro-inductive coil sensor. When the input unit 168, which has an in-built resonant circuit, is located near to a loop coil of the second touch panel 460, a magnetic field transmitted from the loop coil generates current based on mutual electromagnetic induction in the resonant circuit of the input unit 168. An inductive magnetic field is generated based on the current from a coil (not shown) of the resonant circuit of the input unit 168 and the second touch panel 460 detects an inductive magnetic field from a loop coil in a signal reception state, thereby detecting a hovering position or a touched position of the input unit 168. The portable terminal 100 senses the height h of a pen point 430 of the input unit 168 above the first touch panel 440. The second touch panel 460 may sense a hovering input and a touch input of any input unit that causes current based on electromagnetic induction. In the examples of the following description, the second touch panel 460 is dedicated to sensing a hovering or touch performed by the input unit 168. The input unit 168 may also be referred to as an electromagnetic pen or an EMR pen. The input unit 168 may be different from an ordinary pen that does not include a resonant circuit that may be sensed by the first touch panel 440. The input unit 168 may be configured to include a button 420 that may change an electromagnetic induction value caused by a coil inside a pen body near to the pen point 430. The input unit 168 may be described later in greater detail with reference to FIG. 5.

The touch screen controller 195 may include a first touch panel controller and a second touch panel controller. The first touch panel controller converts an analog signal corresponding to a hand touch or a pen touch, received from the first touch panel 440 to a digital signal (e.g., X, Y and Z coordinates) and transmits the digital signal to the controller 110. The second touch panel controller converts an analog signal corresponding to a hovering or touch of the input unit 168, received from the second touch panel 460 to a digital signal and transmits the digital signal to the controller 110. The controller 110 controls the display panel 450, the first touch panel 440, and the second touch panel 460 based on the digital signals received from the first and second touch panel controllers. For example, the controller 110 may display a predetermined screen on the display panel 450 in response to a hovering or touch of a finger, a pen, or the input unit 168.

Therefore, the first touch panel 440 is able to sense a finger touch or a pen touch and the second touch panel 460 may sense a hovering or touch of the input unit 168 in the portable terminal 100 in the embodiment of the present invention. Thus the controller 110 of the portable terminal 100 distinguishes a finger touch or a pen touch from a hovering or touch of the input unit 168. While only one touch screen is shown in FIG. 4, embodiments of the present invention are not limited to a single touch screen, and portable terminals may have a plurality of touch screens in accordance with embodiments of the present invention. Each touch screen may engage with one housing via a hinge. Alternatively, a plurality of touch screens may be mounted in a single housing in the portable terminal 100. As illustrated in FIG. 4, each touch screen includes a display panel and at least one touch panel.

Figure 5:
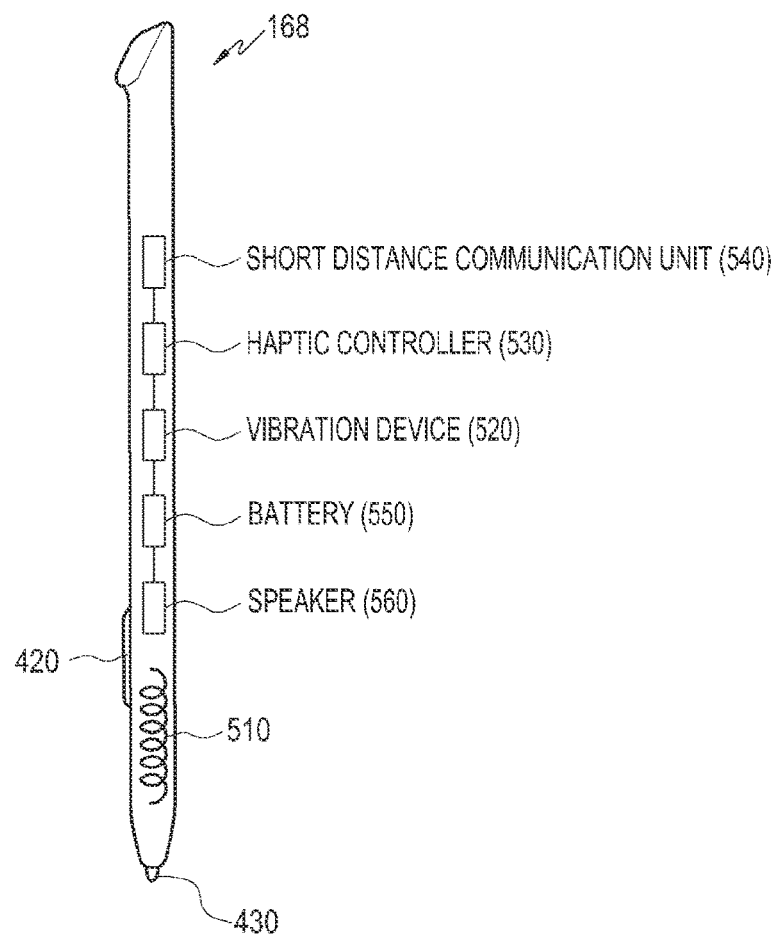
FIG. 5 is a block diagram of an input unit that provides a haptic effect according to an embodiment of the present invention.

FIG. 5 is a block diagram of an input unit that provides a haptic effect according to an embodiment of the present invention.

Referring to FIG. 5, the input unit 168 (e.g., a touch pen) according to an embodiment of the present invention includes a pen point 430 at an end of the touch input unit 168, a button 420 located near the pen point 403 that changes an electromagnetic induction value generated by a coil 510 inside the input unit 168, and a vibration device 520 that vibrates to create a hovering input effect. The input unit 168 further includes a haptic controller 530 that analyzes a control signal received from the portable terminal 100 and corresponding to a hovering, and that controls a vibration strength and a vibration cycle of the vibration device 520 to provide a haptic effect to the input unit 168. The input unit 168 further includes a short-range communication unit 540 that communicates with the portable terminal 100 by short-range communication, and a battery 550 that supplies power to vibrate the input unit 168. The input unit 168 further includes a speaker 560 that outputs a sound corresponding to the vibration cycle and/or vibration strength of the input unit 168. The speaker 560 also outputs a sound corresponding to a haptic effect provided to the input unit 168 to the speaker 163 of the portable terminal 100 at the same time or a predetermined time (e.g., 10 ms) earlier or later.

Specifically, the speaker 560 outputs sounds corresponding to various signals (e.g., a wireless signal, a broadcast signal, a digital audio file, a digital video file, etc.) received from the mobile communication module 120, the sub-communication module 130, and the multimedia module 140 of the portable terminal 100 under the control of the haptic controller 530. Further, the speaker 560 outputs sounds corresponding to functions executed in the portable terminal 100 (e.g., a button manipulation sound or a ring-back tone in a call). One or more speakers 560 may be provided at an appropriate position(s) of a housing of the input unit 168.

When the pen point 430 touches the touch screen 190 or the pen point 430 is placed at a hovering sensed position (e.g., 5 mm above the touch screen 190), the haptic controller 530 analyzes at least one control signal received from the portable terminal 100 through the short-range communication unit 540 and controls a vibration cycle, a vibration strength, etc., of the vibration device 520 of the input unit 168 according to the analysis. The short-range communication unit 540 and the vibration device 520 are activated before the haptic controller 530 receives the control signal. The portable terminal 100 transmits the control signal. The control signal may be transmitted to the input unit 168 during a predetermined time, or periodically until a touch is completed. When the pen point 430 touches the touch screen 190, the portable terminal 100 identifies an object (or icon) pointed to by the pen point 430 on the touch screen 190 and transmits a control signal corresponding to a haptic pattern preset for the object to the short-range communication unit 540 of the input unit 168. This control signal causes different vibrations for different modes to be applied to an object displayed on the touch screen 190. The modes include at least one of a mode for cutting a part of a displayed object, a mode of drawing a contour around a displayed object, a mode for controlling the portable terminal 100 according to a pattern input on the touch screen 190 by the input unit 168, and a mode for applying a pen function to the input unit 168. In addition to these modes, a mode for controlling an application stored in the portable terminal 100 and an application displayed on the touch screen 190 is also available.

The control signal is transmitted to the input unit 168 through at least one of the mobile communication module 120 and the sub-communication module 130 of the portable terminal 100. The control signal includes at least one of activation information for the vibration device 520 of the input unit 168, information about a vibration strength of the input unit 168, deactivation information for the vibration device 520 of the input unit 168, and information about a total duration of a haptic effect. Since the control signal is about 8 bits long and is repeatedly transmitted at every one of a predetermined interval (e.g., every 5 ms) to thereby control vibrations of the input unit 168, a user is able to recognize periodic repeated vibrations that give a haptic effect. For example, the control signal may include information listed in Table 1 below.

TABLE 1

| Field | Activation of vibration device | Vibration strength | Deactivation of vibration device |
|---|---|---|---|
| Information | 1 | 125 125 131 131 0 | 2 |

As illustrated in Table 1, the control signal includes activation information, vibration strength information, and deactivation information about the vibration device 520 of the input unit 168. The control signal may be transmitted to the input unit 168 every 5 ms. However, this time period is merely provided as an example, and other time periods may be used in accordance with embodiments of the present invention. Transmission of the control signal may be changed according to the cycle of a haptic pattern. The transmission cycle and duration of the control signal also vary. The transmission duration of the control signal may last until the input unit 168 finishes an instantaneous or continuous touch on the touch screen 190.

The input unit 168, which has the above-described configuration, supports electromagnetic induction. Once a magnetic field is formed at a specific point of the touch screen 190 by the coil 510 of the input unit 168, the touch screen 190 detects a touched position by detecting the position of the magnetic field.

FIGS. 6A to 6D are diagrams illustrating haptic pattern settings according to an embodiment of the present invention.

Figures 6A, 6B:
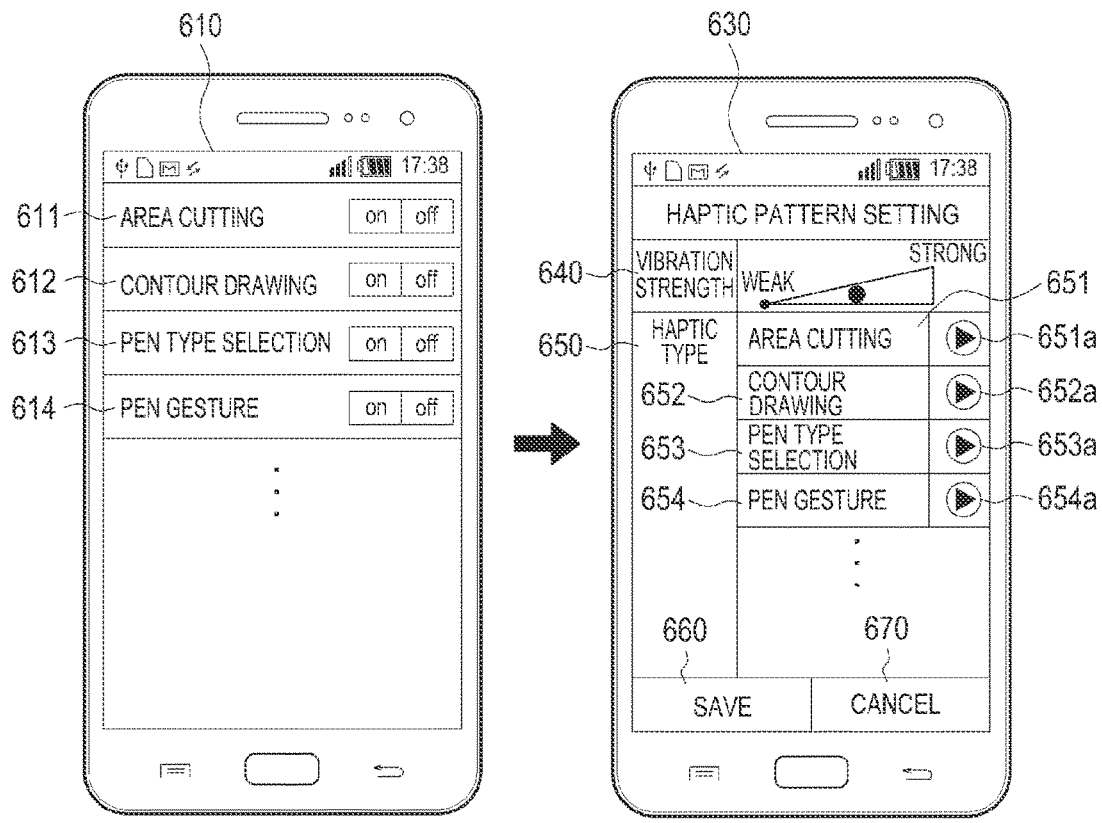
FIG. 6A is a diagram illustrating mode settings to provide a haptic effect to an input unit according to an embodiment of the present invention.
FIG. 6B is a diagram illustrating setting of a vibration strength and a haptic pattern for a selected mode according to an embodiment of the present invention.
Figure 6C:
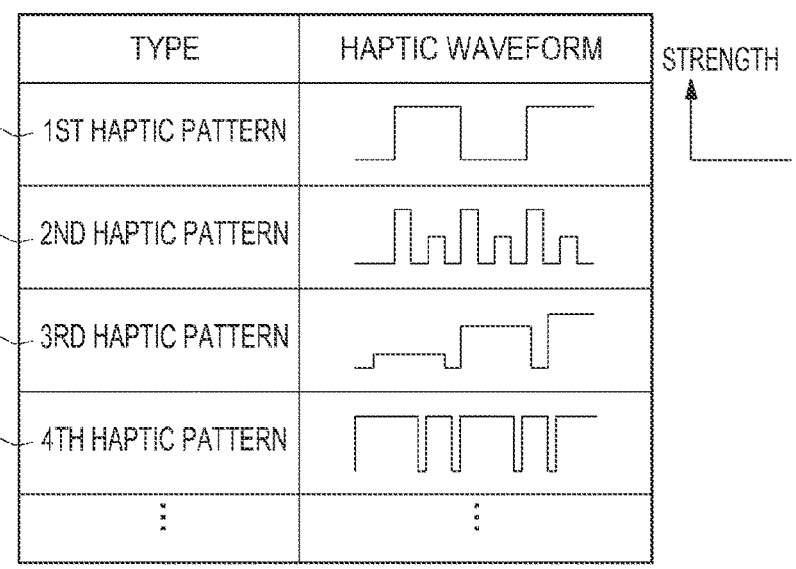
FIG. 6C is a diagram illustrating vibration waveforms available for each mode according to an embodiment of the present invention.

FIG. 6A illustrates mode settings 610 in the portable terminal 100 to provide a haptic effect to the input unit 168 according to an embodiment of the present invention, FIG. 6B illustrates setting 620 of a vibration strength and a haptic pattern for a selected mode according to an embodiment of the present invention, and FIG. 6C illustrates vibration waveforms available for each mode according to an embodiment of the present invention.

Referring to FIG. 6A, among a plurality of modes that provide haptic effects to the input unit 168 according to an embodiment of the present invention, an area cutting mode 611 sets a function of offering a feeling of cutting a material such as paper with scissors to a user, when the user cuts a part of an object such as an image (e.g., a photo, an e-mail, a document, a video, etc.) displayed on the touch screen 190. The haptic effect of giving the tactile cutting feeling may be set to On or Off. If the area cutting mode 611 is set to On, the touch screen 190 displays a closed loop that the input unit 168 draws to cut a part of an image displayed on the touch screen 190 under the control of the controller 110, and the controller 110 displays a cutting line along the drawing direction of the input unit 168 on the touch screen 190. While the closed loop is being drawn, at least one control signal including a haptic pattern corresponding to a feeling of cutting with scissors is transmitted to the input unit 168. The control signal is transmitted repeatedly at every instance of a predetermined interval to the input unit 168, while a cutting line is drawn to select a part to be cut. When the starting and ending points of the closed loop meet with each other and thus the closed loop is finished, a control signal including a haptic pattern corresponding to a tactile feeling of finishing cutting a material such as paper, that is, a tactile feeling felt at a cutting finish time point to the input unit 168. This control signal is intended to offer a tactile feeling of finishing a closed loop to the user at the time point when the input unit 168 matches the end point of the event to the starting point of the event. The control signal carries information required to control a vibration strength and vibration cycle of the input unit 168. The control signal is periodically transmitted to the input unit 168 during the event in progress. The controller 110 enlarges the area selected by the closed loop on the touch screen 190.

A contour drawing mode 612 sets a function for offering a tactile feeling to a user, that simulates a feeling a user would experience if the user drew or wrote using a drawing or writing tool, when the user draws a contour around an image displayed on the touch screen 190 with the input unit 168. A haptic effect of providing the tactile feeling of contour drawing may be set to On or Off. If the contour drawing mode 612 is set to On, the user may draw a contour around an image displayed on the touch screen 190 with the input unit 168. While the user is drawing the contour, at least one control signal including a haptic pattern corresponding to a tactile feeling of drawing or writing with a drawing or writing tool is transmitted to the input unit 168. The control signal may be transmitted repeatedly at every one of a predetermined interval to the input unit 168 during drawing the contour. Upon selection of the contour drawing mode 612, the controller 110 creates a virtual contour by analyzing the light and shade of the image displayed on the touch screen 190. The virtual contour is formed based on the brightness differences between pixels. The user is able to determine, from the virtual contour whether the user is drawing a contour properly. The virtual contour is made more distinctive as the brightness differences between each pixel and its adjacent pixels are larger on the touch screen 190, i.e., the controller 110 creates a virtual contour (or a virtual outline) by analyzing the differences between pixels of the touch screen 190 in terms of brightness and stores the virtual contour in the memory 175. Upon selection of the contour drawing mode 612, a virtual contour is displayed on the touch screen 190. The user may draw a line along the displayed virtual contour with the input unit 168, but the virtual contour may or may not be displayed on the touch screen 190, according to a user's convenience. While the user is drawing a contour along the virtual contour, the contour drawn by the input unit 168 may not match the virtual contour. In this case, the controller 110 measures the gap between the contour drawn by the input unit 168 and the virtual contour. If the gap exceeds a predetermined range, the controller 110 transmits a control signal corresponding to a predetermined haptic pattern. The haptic pattern depends on the gap. For example, when the user draws a contour with the input unit 168, the controller 110 compares the distance between the coordinates of the virtual contour and the coordinates of a position at which the event is generated. If the gap is less than or equal to 1 mm, a control signal corresponding to a haptic pattern with a weak vibration is generated. If the gap is greater than or equal to 3 mm, a control signal corresponding to a haptic pattern with a strong vibration is generated. If the gap is between 1 mm and 3 mm, a control signal corresponding to a haptic pattern with a vibration strength between the vibration strengths of the two haptic patterns is generated. The control signal carrying information about a vibration strength and a vibration cycle is transmitted to the input unit 168.

A pen type selection mode 613 sets a function of applying one or more of a plurality of pens to the input unit 168 functioning as a pen with which to draw or write on the touch screen 190, in order to offer, to a user, the same feeling that would be felt by a user from drawing or writing with a pen, when the user draws or writes using the applied pen. A haptic effect of providing the tactile feeling of writing or drawing with a pen may be set to On or Off. For example, the user feels different haptic textures when drawing or writing by a ball-point pen and a brush. In the present invention, an actual tactile feeling of drawing or writing is simulated for the user, when the user draws or writes on the touch screen 190 with the input unit 168. It is to be clearly understood that the present invention is applicable to any writing tool with which a user writes a character sequence and draws a drawing with a tactile feeling, as well as a ball-point pen, a pencil, a brush, and a marker pen, as available pen types.

A pen gesture mode 614 is a mode to control the portable terminal 100 or a currently executed application according to a gesture or an input pattern of the input unit 168 on the touch screen 190. The pen gesture mode 614 gives the same effect as achieved when a command is input through a direct touch on the touch screen 190, in response to a gesture of the input unit 168. For example, when the user writes '<' on the touch screen 190 using the input unit 168, the touch screen 190 displays a screen to the left of a currently displayed screen or a screen or object previous to the currently displayed screen under the control of the controller 110. When the user writes '>' on the touch screen 190 using the input unit 168, the touch screen 190 displays a screen to the right of a currently displayed screen or a screen or object next to the currently displayed screen under the control of the controller 110. When the user writes '↑' on the touch screen 190 using the input unit 168, the touch screen 190 displays a screen above a currently displayed screen under the control of the controller 110. When the user writes '↓' on the touch screen 190 using the input unit 168, the touch screen 190 displays a screen under a currently displayed screen under the control of the controller 110. Accordingly, upon generation of a gesture by the input unit 168, the controller 110 executes a command corresponding to a matching pre-stored pattern by comparing the pattern of the gesture with pre-stored patterns and transmits a control signal corresponding to the pre-stored pattern to the input unit 168. The above-described operations are merely provided as examples, and therefore, embodiments of the present invention are also applicable to a case where the user inputs a character sequence or an initial sound mapped to each function in a menu of an application, as well as the above simple input case.

Referring to FIG. 6B, if the user sets a haptic pattern for at least one of the above-described modes illustrated in FIG. 6A, a vibration strength menu 640 to control a vibration strength corresponding to a haptic pattern for a mode, a haptic type menu 650 to allow a user to select a haptic type for the mode, a save menu 660 to store a set vibration pattern, and a cancel menu 670 to cancel the vibration pattern are displayed on a screen. For each of the modes 651 to 654, one of haptic waveforms 681 to 684 illustrated in FIG. 6C is selected by selecting a waveform selection menu 651, 652, 653 or 654 corresponding to the mode. FIG. 6C illustrates vibration patterns for respective haptic waveforms, which will be described below.

Referring to FIG. 6C, each haptic pattern has a periodic or an aperiodic waveform. The waveform strengths of the haptic patterns 681 to 684 may be set by the user and a different vibration strength may be set for each haptic pattern. In FIG. 6C, the horizontal axis (i.e. the X axis) represents a vibration cycle of a haptic pattern in time and the vertical axis represents the vibration strength of the haptic pattern. While four haptic patterns are shown in FIG. 6C, embodiments of the present invention may use more or less than four haptic waveforms. As illustrated in FIG. 6C, the haptic waveforms may be identical or different. Besides the above-described haptic waveforms, embodiments of the present invention may utilize various other haptic waveforms corresponding to other real-life sensations felt by users.

Figure 15A:
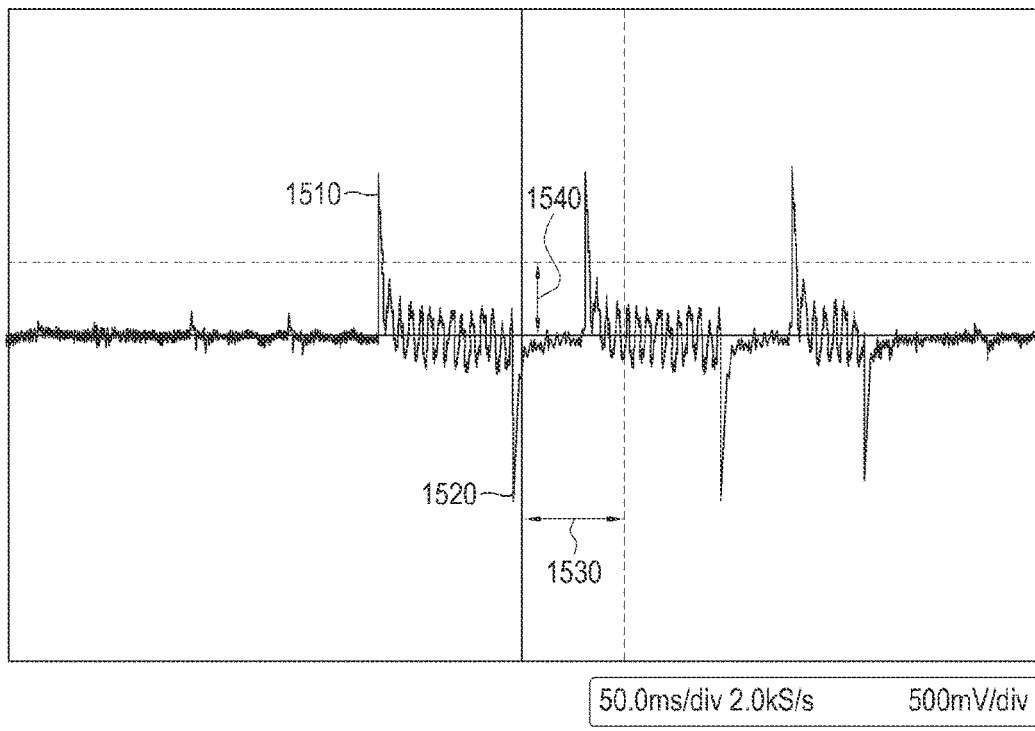
FIGS. 15A to 15H are diagrams illustrating waveforms of various haptic patterns according to an embodiment of the present invention.
Figure 15B:
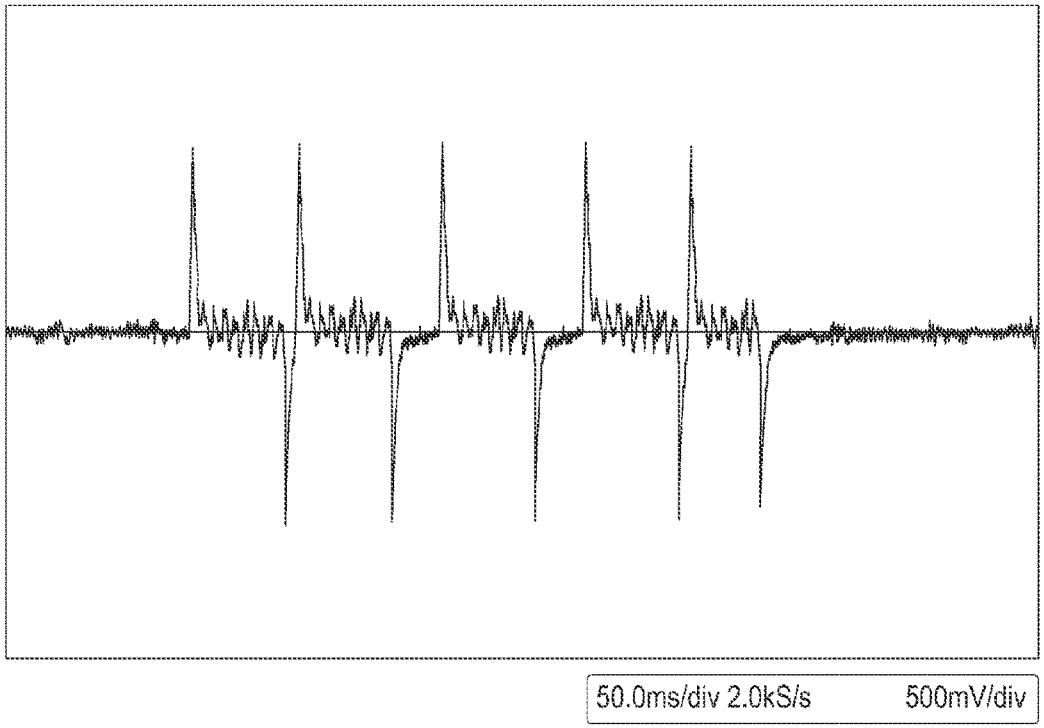
Figure 15C:
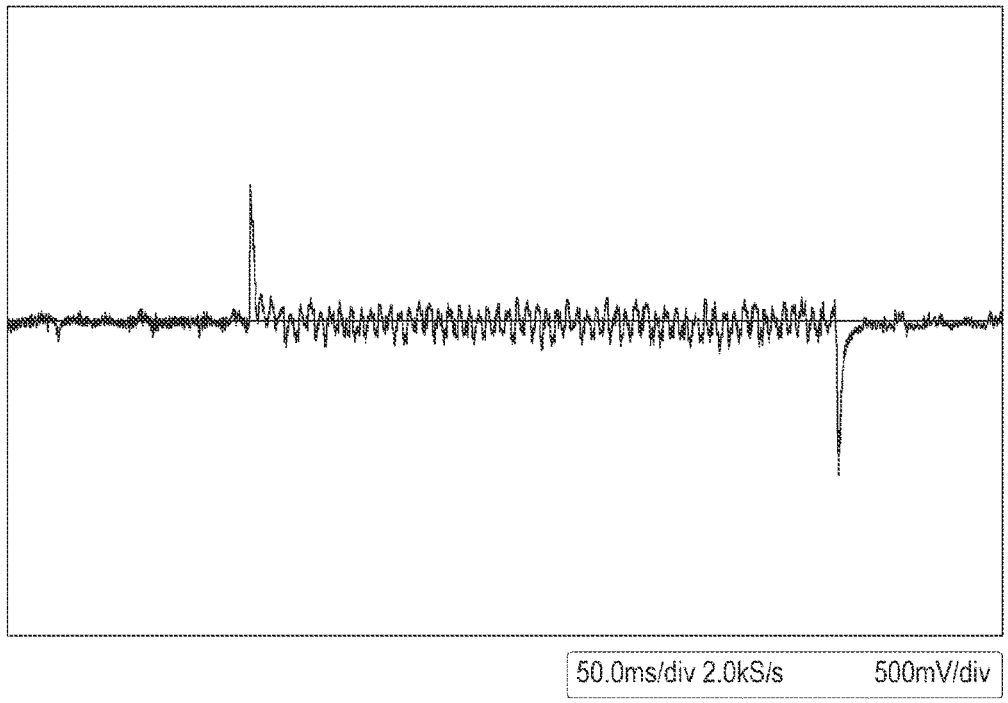
Figure 15D:
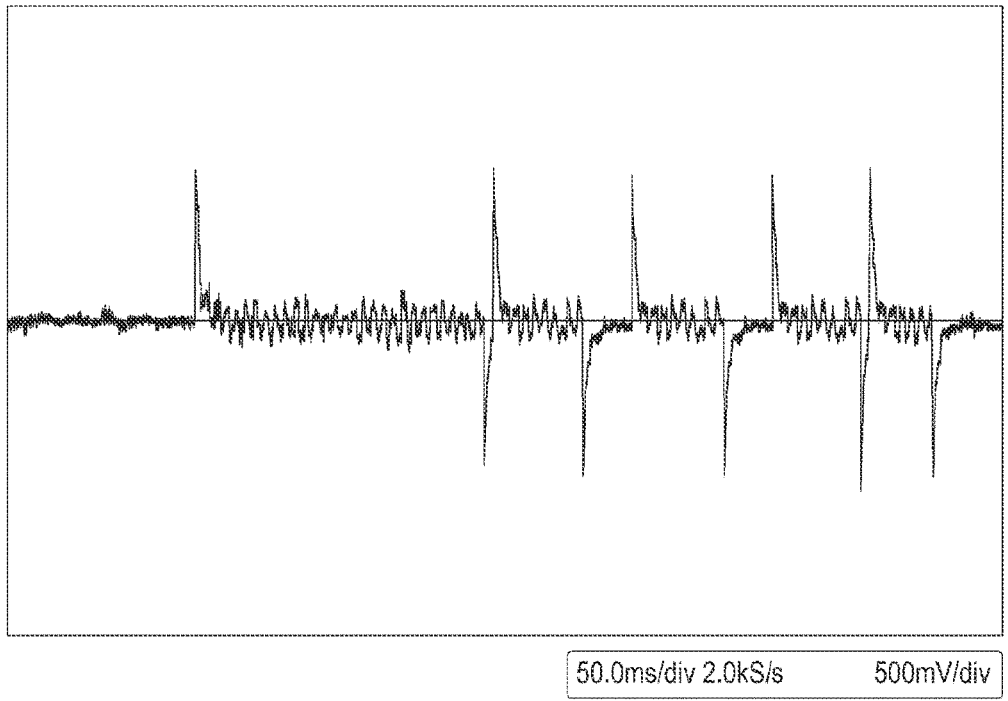
Figure 15E:
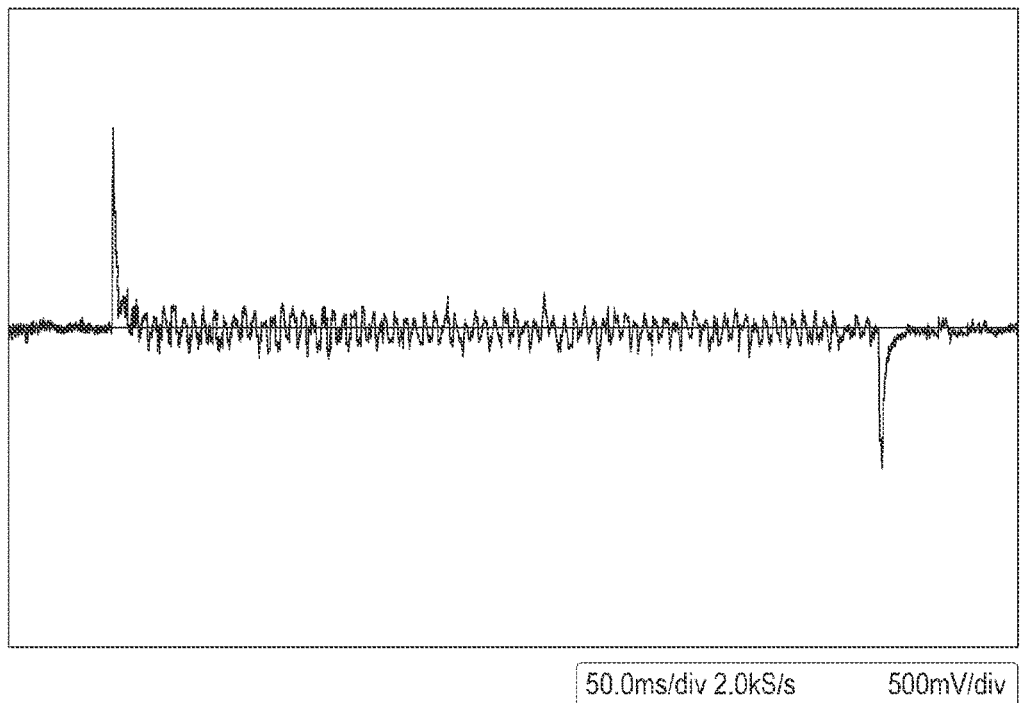
Figure 15F:
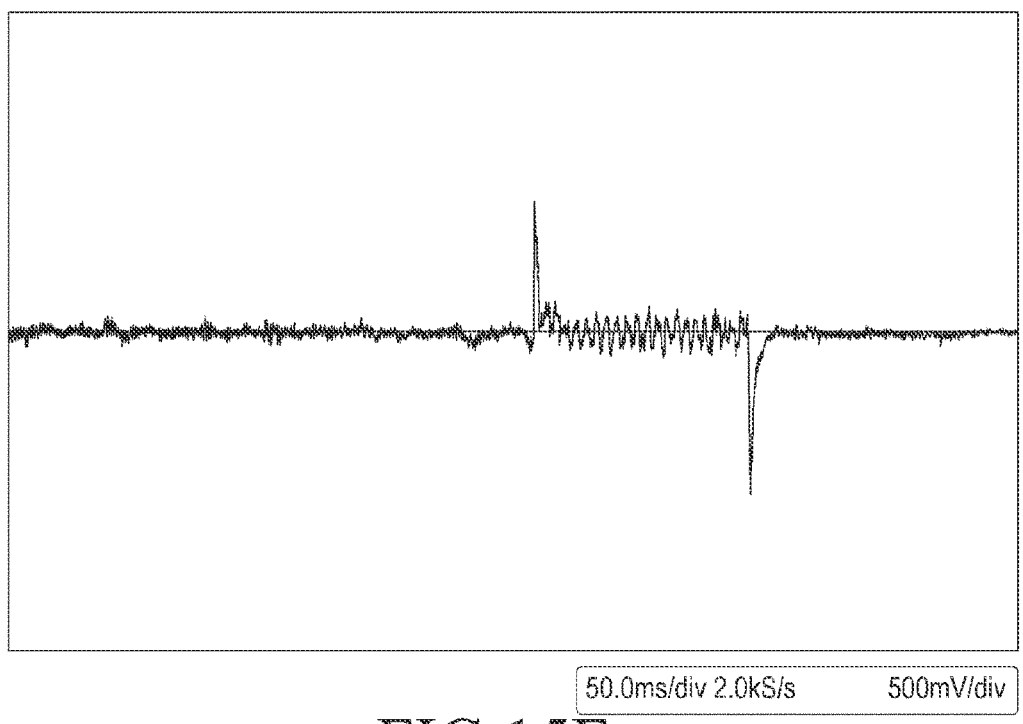
Figure 15G:
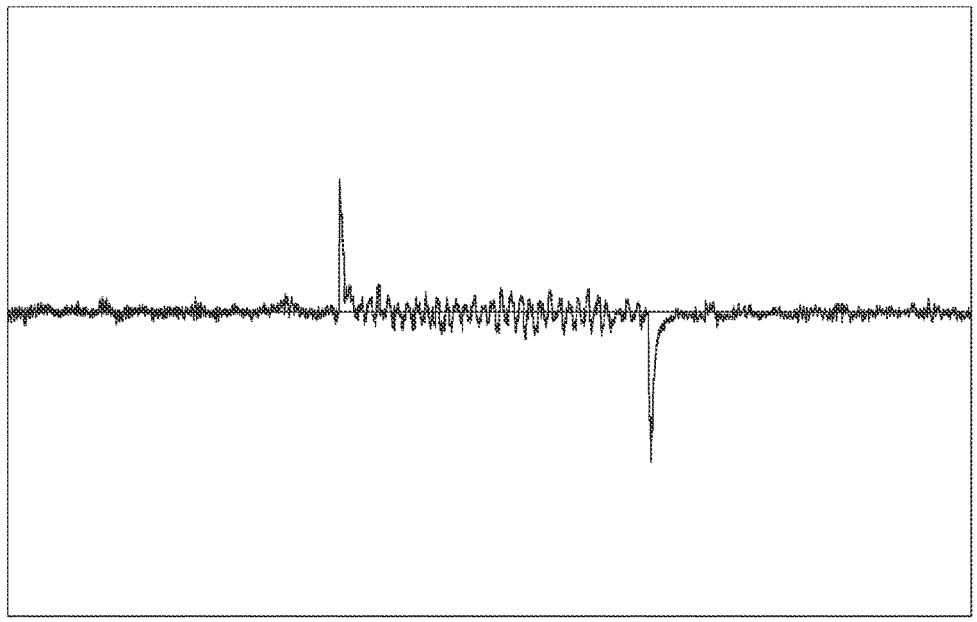
Figure 15H:
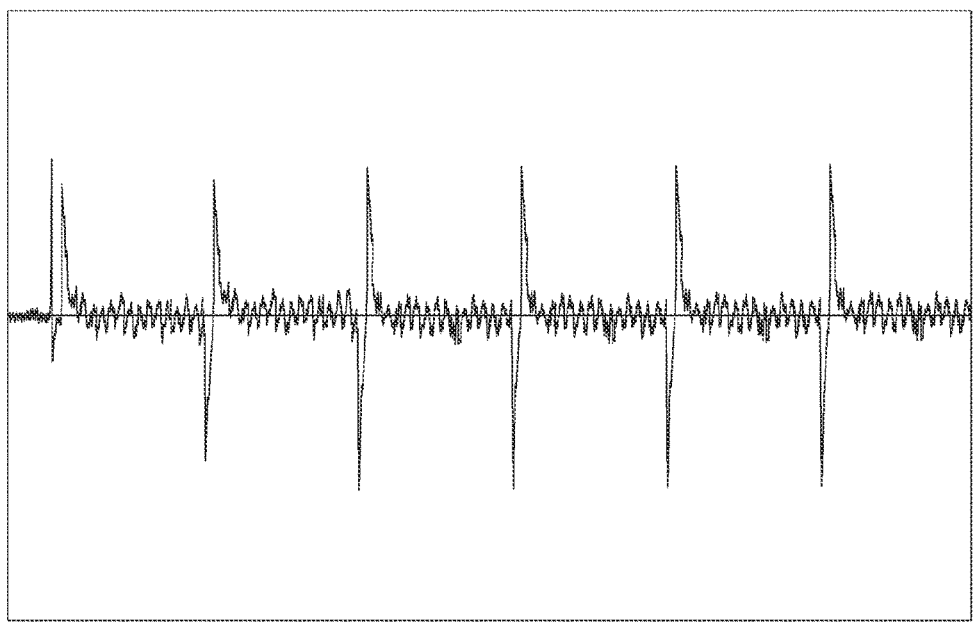

For example, haptic patterns perceived by the user include a haptic pattern cutting a part of an image using an input unit like using scissors (FIG. 15A), a haptic pattern for setting a pen function of the input unit as a pencil (FIG. 15B), a haptic pattern for setting a pen function of the input as a brush (FIG. 15C), a haptic pattern for setting a pen function of the input as a fountain pen (FIG. 15D), a haptic pattern for setting a pen function of the input as a marker pen (FIG. 15E), a haptic pattern for setting a pen function of the input as a ball-point pen (FIG. 15F), a haptic pattern for controlling the portable terminal according to an input pattern of the input unit (FIG. 15G), and a haptic pattern for setting a function of the input unit as an eraser (FIG. 15H).

Figure 7:
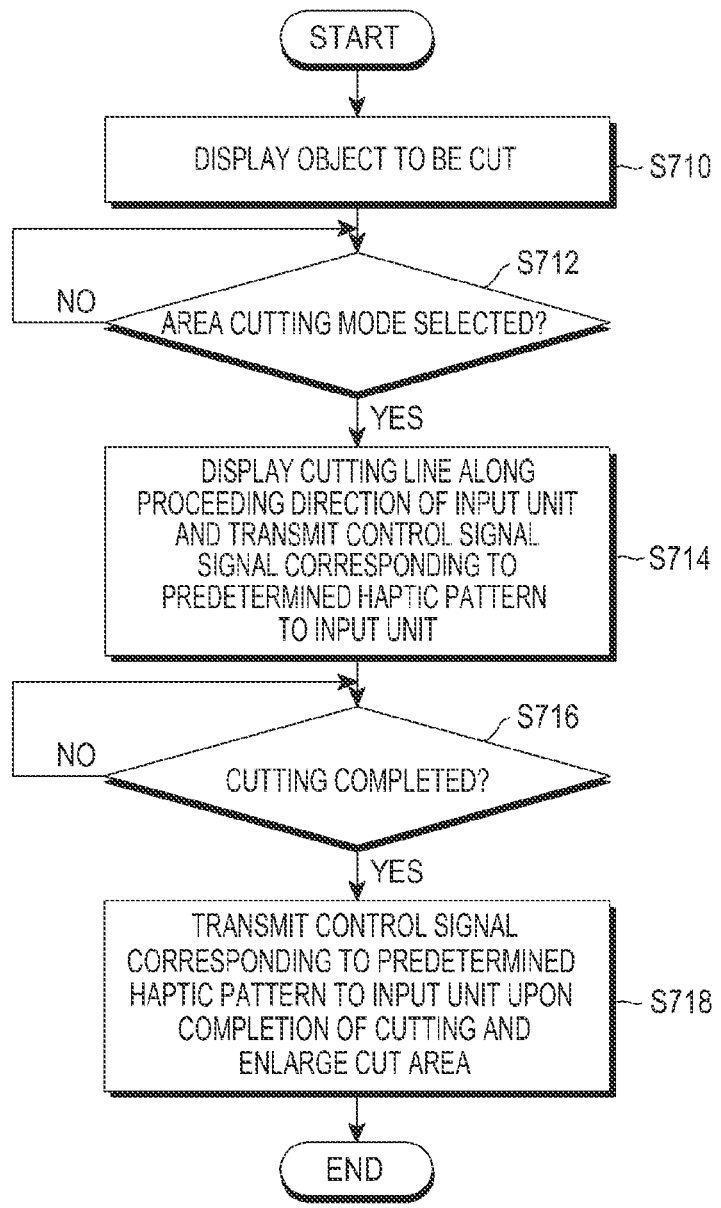
FIG. 7 is a flowchart illustrating an operation of transmitting a control signal corresponding to a haptic pattern, when a part of an image displayed on a touch screen is cut, according to an embodiment of the present invention.

FIG. 7 is a flowchart illustrating an operation of transmitting a control signal corresponding to a haptic pattern, when a part of an image displayed on a touch screen is cut, according to an embodiment of the present invention, FIGS. 8A to 8D are diagrams illustrating an example of cutting of a part of an image displayed on a touch screen according to an embodiment of the present invention, and FIG. 15A is a diagram illustrating the waveform of a haptic pattern for cutting a part of an image with scissors through an input unit according to an embodiment of the present invention.

Figure 8A:
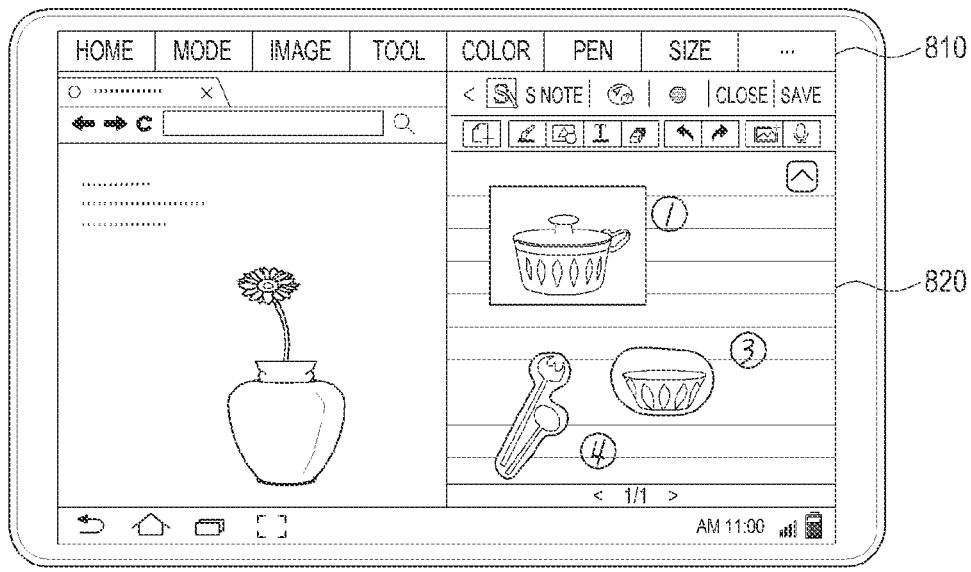
FIG. 8A is a diagram illustrating an image displayed on a touch screen according to an embodiment of the present invention.
Figure 8B:
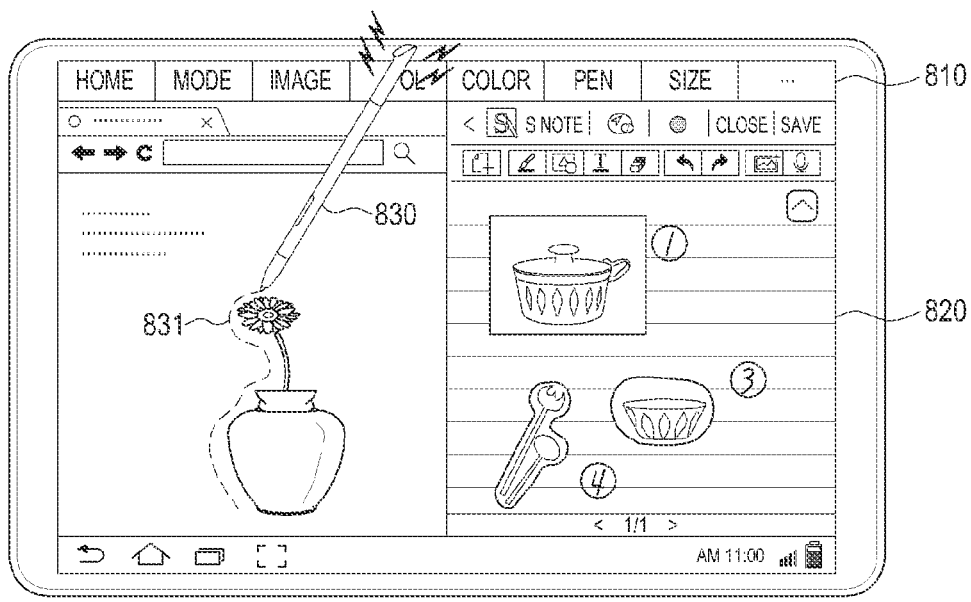
FIG. 8B is a diagram illustrating cutting of a part of an image displayed on a touch screen according to an embodiment of the present invention.
Figure 8C:
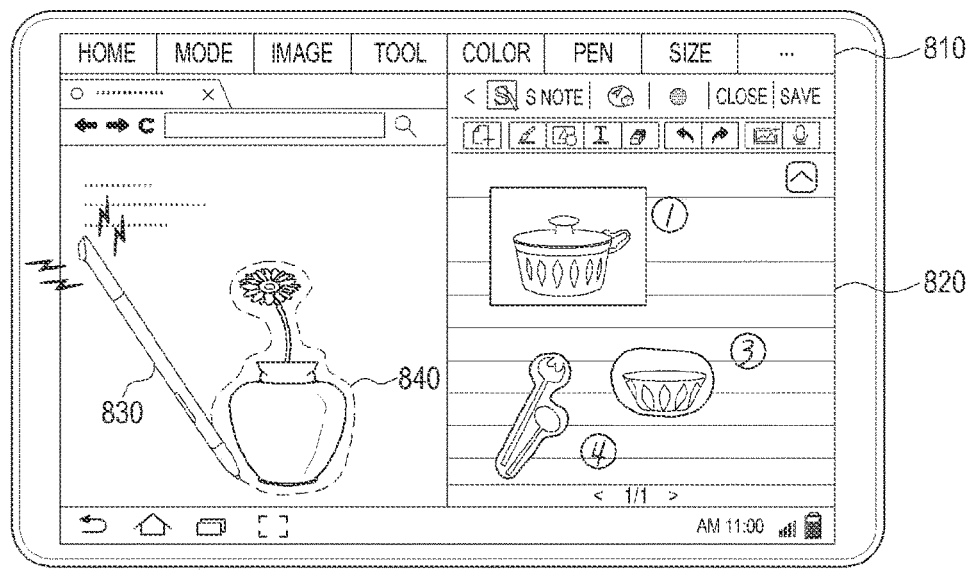
FIG. 8C is a diagram illustrating selection of a partial area to be cut from an image displayed on a touch screen according to an embodiment of the present invention.
Figure 8D:
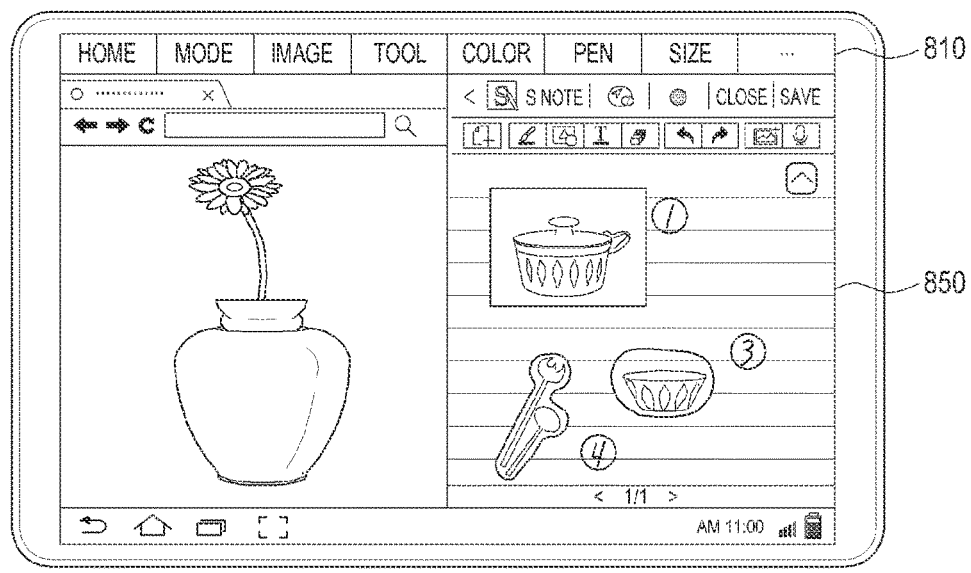
FIG. 8D is a diagram illustrating an enlarged view of a partial area selected from an image displayed on a touch screen according to an embodiment of the present invention.

FIG. 8A illustrates an image displayed on a touch screen according to an embodiment of the present invention, FIG. 8B illustrates cutting of a part of an image displayed on a touch screen according to an embodiment of the present invention, FIG. 8C illustrates selection of a partial area to be cut from an image displayed on a touch screen according to an embodiment of the present invention, and FIG. 8D illustrates an enlarged view of a partial area selected from an image displayed on a touch screen according to an embodiment of the present invention.

An operation of transmitting a control signal corresponding to a haptic pattern for a case where a part of an image displayed on a touch screen is cut according to an embodiment of the present invention is described in detail as follows with reference to FIGS. 7 to 8D.

A desired object to be partially cut is displayed in step S710. The object may be any of an image, text, a photo, and a video, to which the present invention is not limited. Embodiments of the present invention are applicable to any other object that can be partially cut. The object is displayed on a screen of the touch screen. When an object is displayed, a menu bar 810 is displayed in a part of the touch screen, to change attributes of the displayed object, and a screen 820 is displayed at another part of the touch screen, to display objects actually. The menu bar 810 includes various functions such as Home, Mode, Image, Tool, Color, Pen, Size, etc, as illustrated in FIGS. 8A to 8D.

Upon selection of an area cutting mode with the object displayed on the touch screen, a cutting line (831 in FIG. 8B) is displayed along a proceeding direction of an input unit 830 and a signal corresponding to a preset haptic pattern is transmitted to the input unit 830 in steps S712 and S714. The area-cutting mode may be selected before or after the object is displayed. As illustrated in FIG. 8B, when the user is to cut a part of the object displayed on the touch screen, the user selects the part of the object using the input unit 830. Then the cutting line 831 representing selection of the part of the object is displayed along the proceeding direction of the input unit 830. The portable terminal transmits a control signal corresponding to the preset haptic pattern to the input unit 830, while the part of the object is being selected.

While the part of the object the object is being cut on the touch screen, the control signal corresponding to the preset haptic pattern is transmitted to the input unit 830. The input unit 830 vibrates in correspondence with the haptic pattern by analyzing the at least one control signal received from the portable terminal 100 while the part of the object is being cut. Accordingly, while the part of the object is being cut, the portable terminal transmits, to the input unit 830, a control signal including a haptic pattern corresponding to a tactile feeling felt when a cutting material such as paper is cut with scissors, as illustrated in FIG. 15B.

When the cutting line (831 in FIG. 8B) is displayed and the part of the object is completely cut during transmission of the control signal (840 in FIG. 8C) in step S714, a preset haptic signal corresponding to the completion of the cutting is transmitted to the input unit 830, and the cut area (840 in FIG. 8D) is enlarged in steps S716 and S718. As described herein above, an intended area of an object may be cut in a curve or in a line, similar to a real-life object being cut with scissors. Completion of cutting the part of the object in step S716 refers to formation of a cutting line into a closed loop. The portable terminal checks whether the starting and ending points of the cutting line are the same, and determines that a closed loop has been formed, if the starting and ending points of the cutting line are the same. Once the closed loop is formed (840 in FIG. 8C), the portable terminal transmits a control signal corresponding to a haptic pattern representing selection of the part of the object to the input unit 830. A haptic pattern transmitted during cutting of an object provides an output that gives a user a feeling similar to that which a user would feel during cutting a material such as paper, and a haptic pattern transmitted upon completion of the cutting gives the user a feeling similar to that which the user would feel at the moment the user finishes cutting the paper. The haptic pattern in the middle of object cutting may be identical to or different from the haptic pattern at the moment of completing the cutting. If the part of the object is selected or completely cut, the cut area (840 in FIG. 8C) is displayed on the screen 850 in FIG. 8D, and the control signal corresponding to the haptic pattern that gives a tactile feeling of finishing cutting paper is transmitted to the input unit 830.

FIG. 15A illustrates the waveform of a haptic pattern when cutting a part of an image using an input unit. Activation/deactivation of the vibration device 520 of the input unit 168 is relatively periodic, since the spreading angle of fingers is relatively constant and paper cutting is relatively regular when a user cuts a material such as paper. Thus, the haptic pattern simulates the actual paper cutting. In the haptic pattern, vibrations start with a vibration strength corresponding to 1V, continue with a vibration strength corresponding to 50 mV for 70 ms, and then return to the vibration strength corresponding to 1V. This waveform may be repeated periodically. The haptic controller 530 switches the vibration device 520 to an active mode at a time point

1510, vibrates the input unit 168 for about 50 ms, and switches the vibration device 520 to an inactive mode at the ending point 1520 of the about 50 ms. For the 50 ms, the input unit 168 vibrates with a predetermined haptic pattern according to movement of the input unit 168. The vibration strength and the vibration cycle may be set to be variable. Stronger vibrations are generated for a tactile feeling felt by a hand of a user while the user is cutting a material with scissors than for a tactile feeling felt when the user writes text with a pen. Therefore, in the example of FIG. 15A, the vibration strength during the vibration cycle is greater than that provided when performing pen writing.

Figure 9:
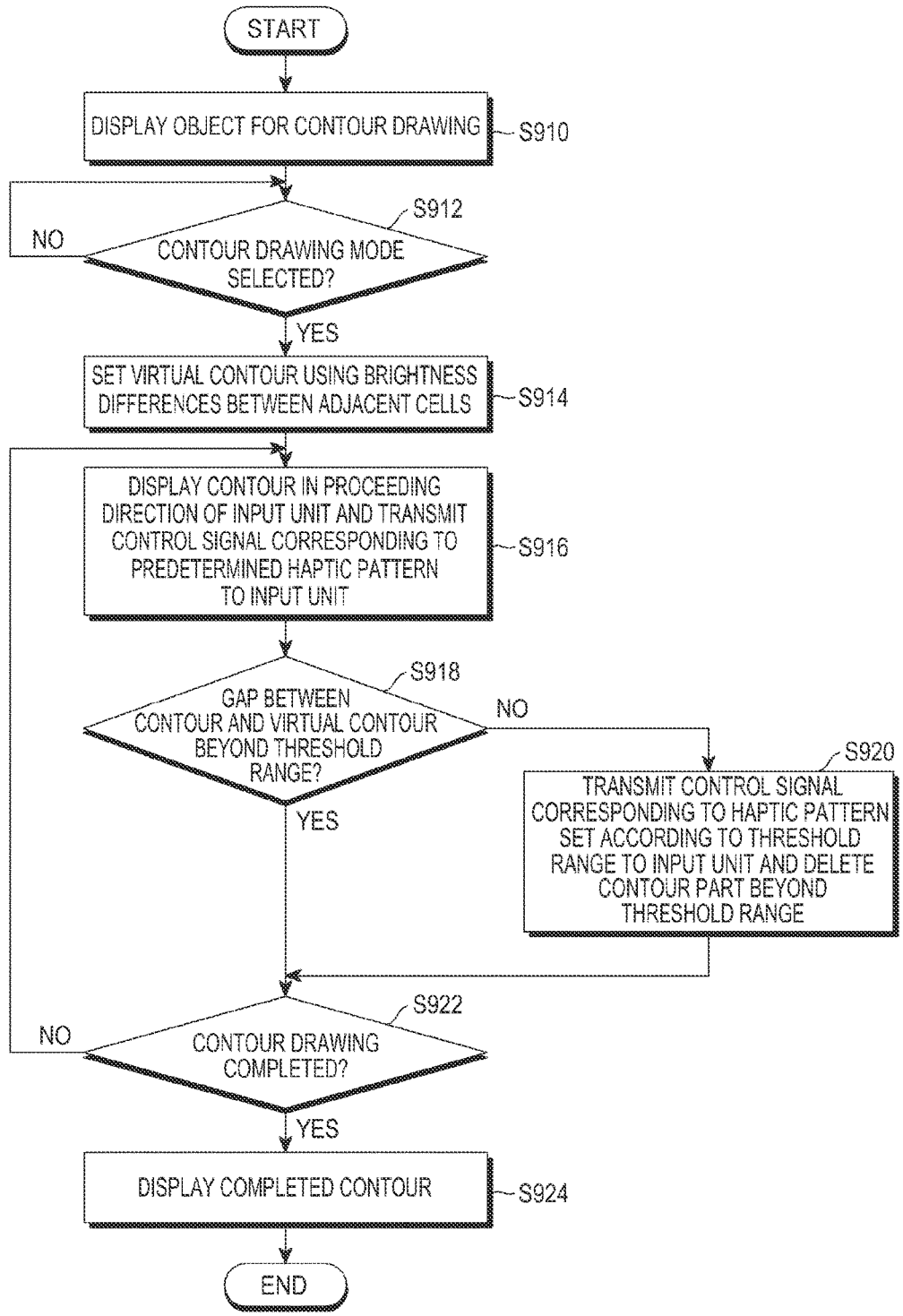
FIG. 9 is a flowchart illustrating an operation of transmitting a control signal corresponding to a haptic pattern, when a contour is drawn around an image displayed on a touch screen, according to an embodiment of the present invention.

FIG. 9 is a flowchart illustrating an operation of transmitting a control signal corresponding to a haptic pattern, when a contour is drawn around an image displayed on a touch screen according to an embodiment of the present invention, and FIGS. 10A to 10D are diagrams illustrating an operation of drawing a contour around an image displayed on a touch screen according to an embodiment of the present invention.

Figure 10A:
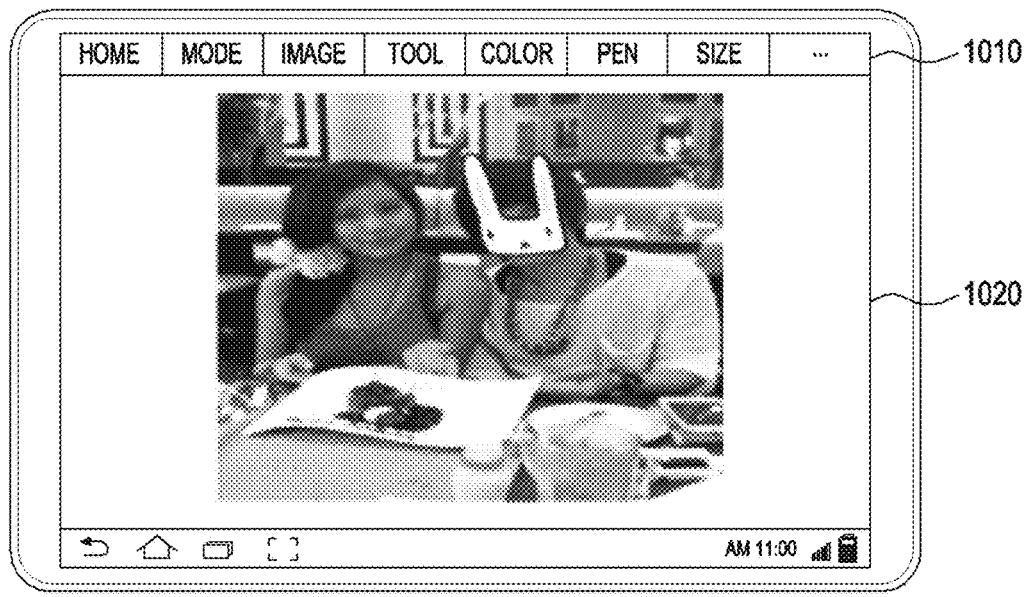
FIG. 10A is a diagram illustrating an image displayed on a touch screen, around which a contour will be drawn, according to an embodiment of the present invention.
Figure 10B:
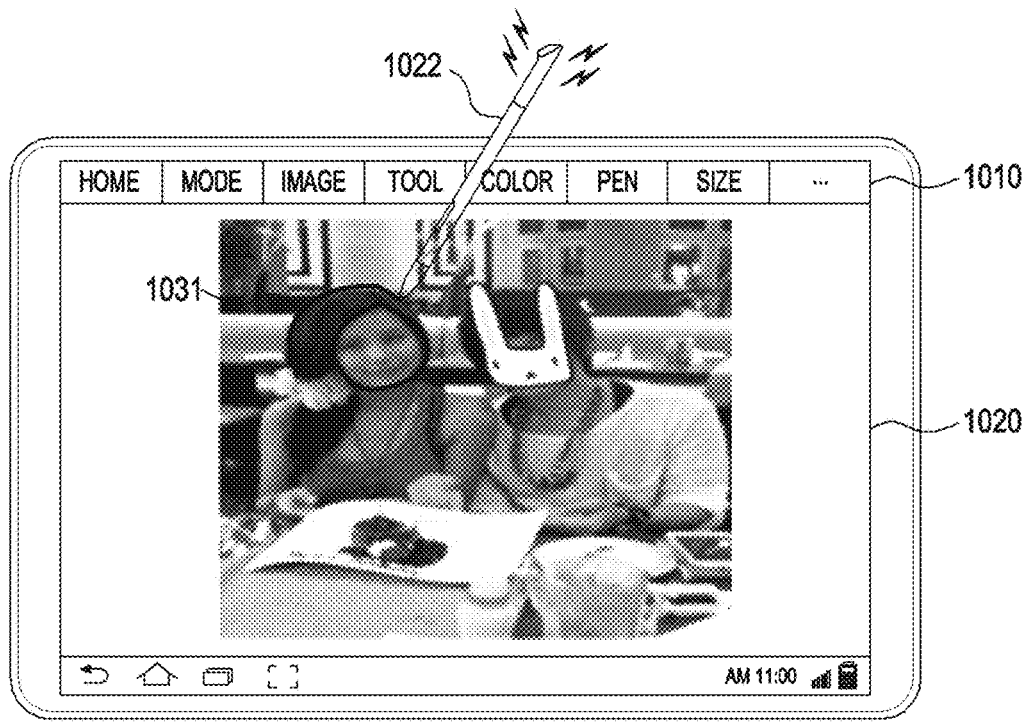
FIGS. 10B and 10C are diagrams illustrating an operation of drawing a contour around an image displayed on a touch screen according to an embodiment of the present invention.
Figure 10C:
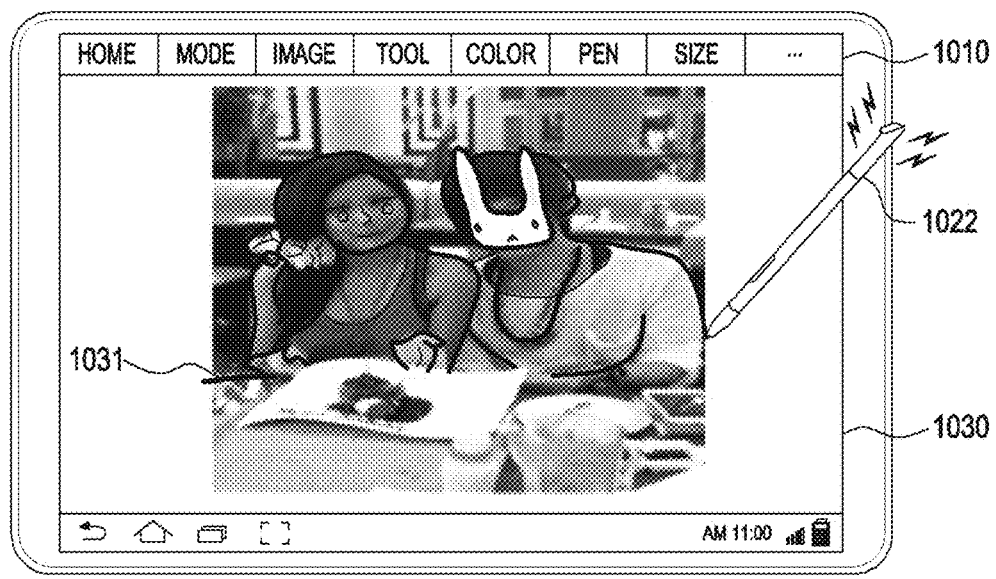
Figure 10D:
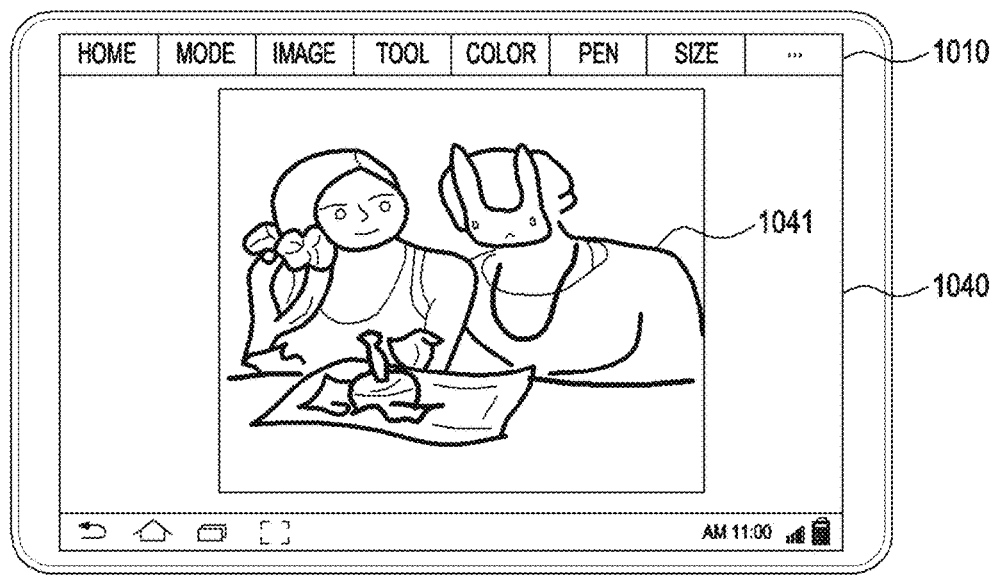
FIG. 10D is a diagram illustrating a completed contour drawing around an image displayed on a touch screen according to an embodiment of the present invention.

FIG. 10A is a diagram illustrating an image displayed on a touch screen, around which a contour will be drawn, according to an embodiment of the present invention, FIGS. 10B and 10C are diagrams illustrating an operation of drawing a contour around an image displayed on a touch screen according to an embodiment of the present invention, and FIG. 10D is a diagram illustrating an image displayed on a touch screen, around which a contour is completely drawn, according to an embodiment of the present invention.

With reference to FIGS. 9 to 10D, an operation of transmitting a control signal corresponding to a haptic pattern for a case of drawing a contour around an image displayed on a touch screen according to an embodiment of the present invention will be described in detail.

An object around which a contour will be drawn is displayed on a screen 1020. When the object is displayed, a menu bar 1010 provides various functions such as Home, Mode, Image, Tool, Color, Pen, Size, and the like to change attributes of the object, as illustrated in FIGS. 10A to 10D.

Upon selection of a contour drawing mode, a virtual contour is set based on the brightness difference between adjacent cells in steps S912 and S914. The controller 110 analyzes the brightness of every pixel in the displayed object. Each pixel of the touch screen 190 has a brightness level assigned under the control of the controller 110. The controller 110 analyzes the brightness differences between adjacent pixels based on the brightness of each pixel and forms a virtual contour around the object according to the analyzed results. The virtual contour may or may not be visible to the user.

A contour (1031 in FIGS. 10B and 10C) is displayed along a proceeding direction of an input unit 1022 and a control signal corresponding to a preset haptic pattern is transmitted to the input unit 1022 in step S916. The controller 110 displays the contour (1031 in FIGS. 10B and 10C) on a screen 1030 in the proceeding direction of the input unit 1022 along the virtual contour formed based on the light and shade of the object. The controller 110 transmits a control signal corresponding to a preset haptic pattern to the input unit 1022, while the contour (1031 in FIGS. 10B and 10C) is being drawn along the virtual contour by the input unit 1022.

The gap between the displayed contour and the virtual contour is calculated. If the gap is within a threshold range, a signal corresponding to a haptic pattern set for the threshold range is transmitted to the input unit 1022 and a part of the displayed contour beyond the threshold range is deleted in steps S918 and S920. The controller 110 determines whether the gap between the contour formed along the proceeding direction of the input unit 1022 and the virtual contour is beyond the predetermined threshold range. Each time the gap between the contour and the virtual contour is beyond the predetermined threshold range, the controller 110 transmits a control signal corresponding to a predetermined haptic pattern to the input unit 1022. When the gap is beyond the threshold range, the control signal is transmitted to the input unit 1022, while a part of the contour beyond the threshold range is deleted. When the contour is deleted, a control signal corresponding to a predetermined haptic pattern for contour deletion is transmitted to the input unit 1022. The gap may differ according to the skills of a user using the input unit 1022 and a different haptic pattern may be preset for a different gap. For example, if the gap between the virtual contour and the contour drawn by the input unit 1022 is 1 mm or less, the controller 110 generates a control signal corresponding to a haptic pattern with a weak vibration strength, and transmits the control signal to the input unit 1022. If the gap is equal to or greater than 3 mm, the controller 110 generates a control signal corresponding to a haptic pattern with a strong vibration strength, and transmits the control signal to the input unit 1022. If the gap is between 1 mm and 3 mm, the controller 110 generates a control signal corresponding to a haptic pattern with a vibration strength between the vibration strengths for a gap less than 1 mm and a gap greater than 3 mm and transmits the control signal to the input unit 1022. In this manner, a different haptic pattern may be preset for a different gap between the two lines and the controller 110 may generate a control signal that increases a vibration strength for a greater difference between the coordinates of the two lines.

If the gap between the displayed contour and the virtual contour is beyond the threshold range in step S918, the portable terminal 100 determines whether the contour drawing is finished in step S922. When the input unit 1022 completely draws a contour along the whole virtual contour formed based on the brightness difference between every pair of pixels, the portable terminal 100 determines that the contour drawing is finished. In FIG. 10D, an object 1041 whose contour is completely drawn is displayed on a screen 1040.

If the contour is yet to be drawn in step S922, the procedure returns to step S916. If the contour is finished, the completed contour is displayed in step S924. Upon completion of the contour drawing in step S922, a control signal corresponding to a predetermined haptic pattern is transmitted to the input unit 1022.

Figure 11:
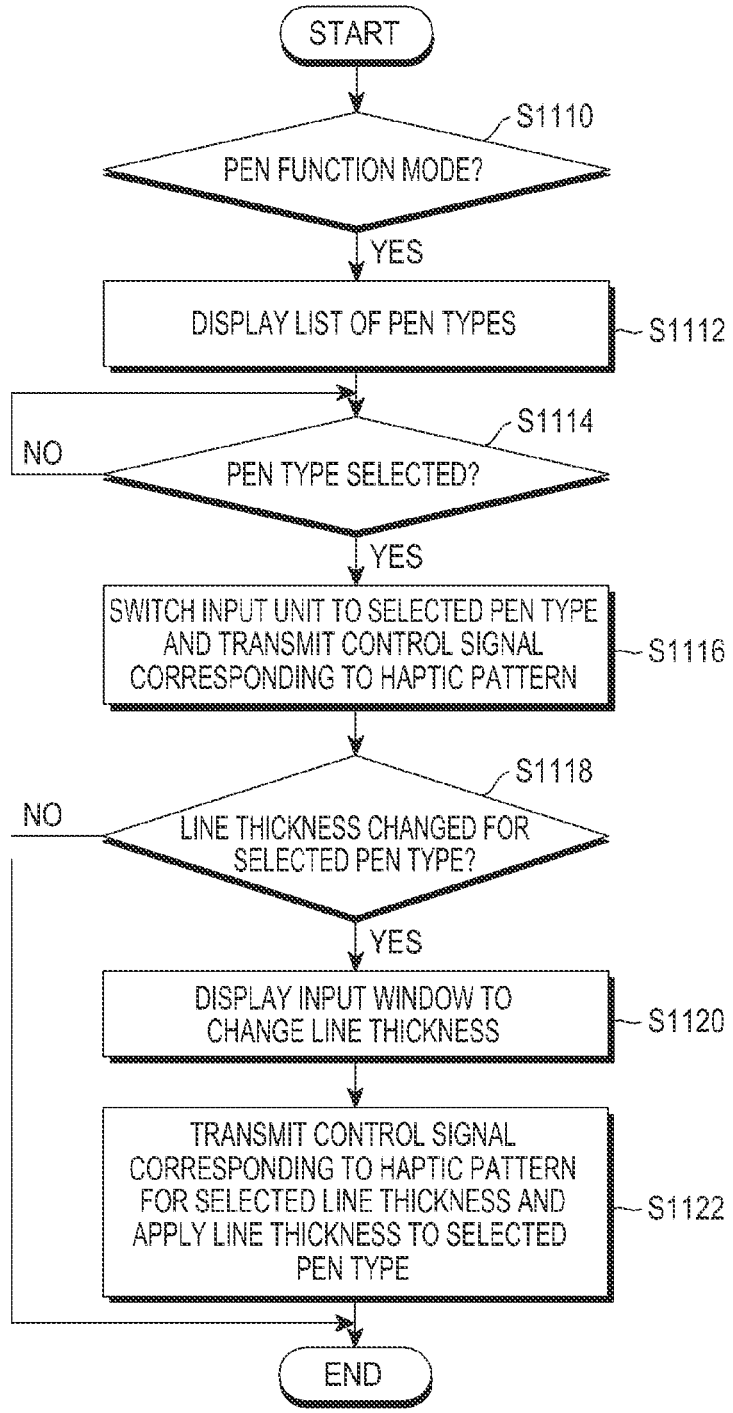
FIG. 11 is a flowchart illustrating an operation of changing a pen type for an input unit acting as a pen according to an embodiment of the present invention.
Figure 12A:
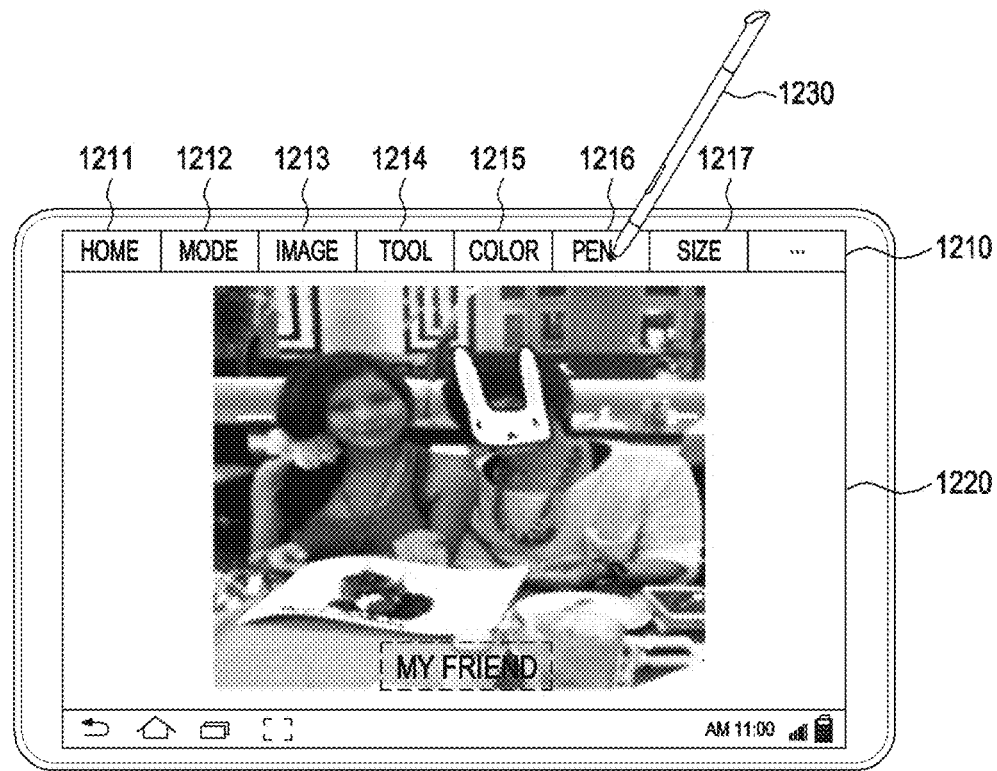
FIG. 12A is a diagram illustrating an initial screen on which a pen type will be changed for an input unit according to an embodiment of the present invention.
Figure 12B:
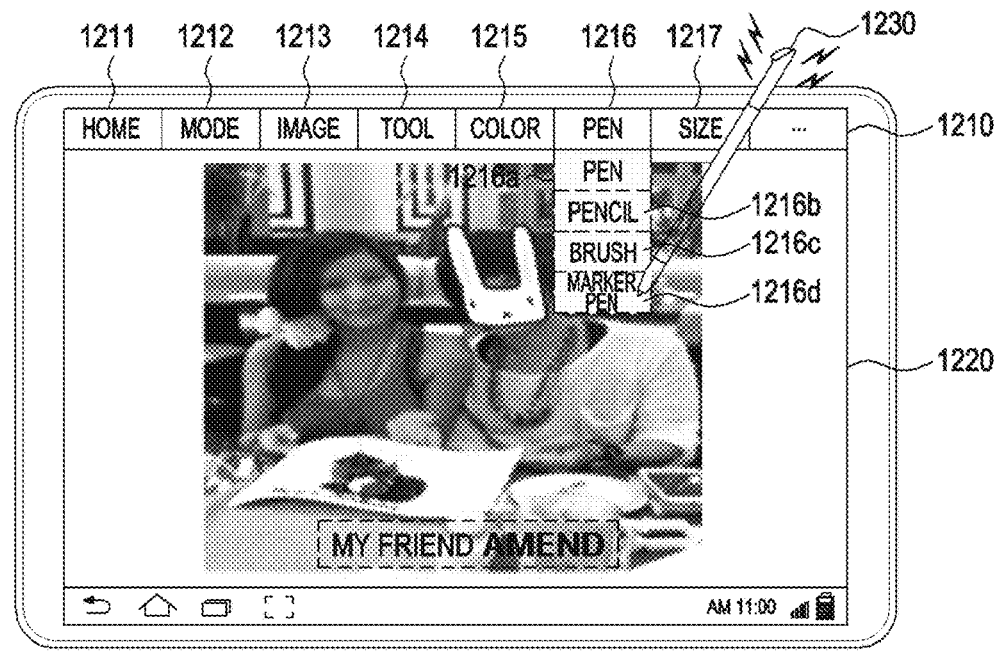
FIG. 12B is a diagram illustrating pen types available for an input unit according to an embodiment of the present invention.
Figure 12C:
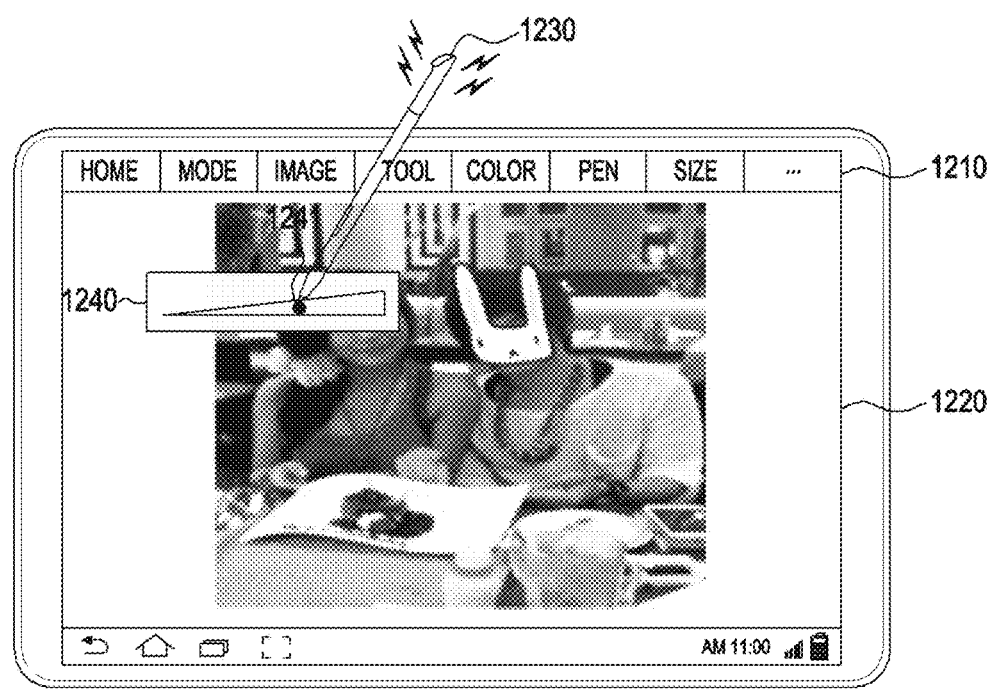
FIG. 12C is a diagram illustrating an operation of controlling the line thickness of a pen applied to an input unit according to an embodiment of the present invention.

FIG. 11 is a flowchart illustrating an operation of changing a pen type for an input unit function as a pen according to an embodiment of the present invention and FIGS. 12A, 12B and 12C are diagrams illustrating an operation of changing a pen type for an input unit functioning as a pen according to an embodiment of the present invention. FIGS. 15B to 15F are diagrams illustrating the waveforms of haptic patterns for pen types applied to an input unit according to an embodiment of the present invention.

FIG. 12A illustrates an initial screen displayed to change a pen type for an input unit according to an embodiment of the present invention, FIG. 12B illustrates pen types available for an input unit according to an embodiment of the present invention, and FIG. 12C illustrates control of the line thickness of a pen applied to an input unit according to an embodiment of the present invention.

With reference to FIGS. 11 to 12C, an operation of changing a pen type for application to an input unit functioning as a pen and adjusting the line thickness of a pen applied to the input unit according to an embodiment of the present invention is described in detail as follows.

Referring to FIG. 12A, the touch screen includes a menu bar 1210 to change an attribute of an object and a screen 1220 to display an object. An object is displayed on a screen of the touch screen. When the object is displayed, the menu bar 1210 and the screen 1220 are provided at parts of the touch screen. The menu bar 1210 includes various menus including a Home menu 1211, a Mode menu 1212, an Image menu 1213, a Tool menu 1214, a Color menu 1215, a Pen menu 1216, and a Size menu 1217 as illustrated in FIGS. 12A, 12B and 12C. Specifically, the Home menu 1211 has basic functions such as save file, open file, etc. The Mode menu 1212 controls the up, down, and sideways movements of an object, and a size of the object, or provides a hovering input, a touch input, or a gesture input of the input unit. The Image menu 1213 controls the color of an object. The Tool menu 1214 provides various functions including coloring, text input, text erasing, etc. The color menu 1215 is used to change colors, such as a background color. When there is a character to be input, a writing tool (e.g., a ball-point pen, a pencil, a brush, a marker pen, etc.) is selected with the Pen menu 1216. With the Size menu 1217, a line thickness of a character thickness is adjusted. These menus are selected by an input unit 1230.

Upon selection of the pen menu 1216 to apply a pen function in step S1110, a list of pen types is displayed in step S1112. Alternatively, upon selection of the pen menu 1216 to change the pen function of the input unit 1230 from a pencil to a marker pen during input of a character sequence in an area of the screen 1220 in a pencil-function input mode, a plurality of pen types are displayed. In this manner, when an object such as an image is displayed on the touch screen 190, the controller 110 executes an application to display an image. Various object displaying applications are available according to the attributes of an object. Each application has a plurality of menus to change the attributes of a displayed object. Upon selection of the pen menu 1216, a plurality of pens are displayed. The pen types provided by the pen menu 1216 include pencil 1216a, ball-point pen 1216b, brush 1216c, and marker pen 1216d. These pen types are and the present invention is applicable to any type of pen as long as it can be used for writing.

When a pen type is initially selected or one pen type is switched to another pen type during input of a character sequence in step S1114, the input unit 1230 is placed in the mode of the selected pen. Then a control signal corresponding to a predetermined haptic pattern is transmitted to the input unit 1230, in step S1116. Upon selection of a pen type by the input unit 1230, the controller 110 switches the pen function of the input unit 1230 to the selected pen type and transmits a control signal corresponding to a haptic pattern preset for the changed pen type to the input unit 1230. For example, as illustrated in FIG. 12A, if a user wants to input text by switching the input unit 1230 from a pencil mode to a marker pen mode while inputting text 'my friend' through the input unit 1230 in a partial area 1231 of a displayed object in the pencil mode, the user selects the marker pen 1216d of the pen menu 1216 and continues to input 'amend' after 'my friend'. According to an embodiment of the present invention, information about vibrations corresponding to different haptic patterns for different pen types is stored in the memory 175. For example, when the input unit 1230 is switched to the ball-point mode 1216b through the pen menu 1216, the memory 175 stores information about vibrations for a haptic pattern, in order to give, to the user, a tactile feeling corresponding to that felt from drawing a line or writing text with a ball-point pen. The memory 175 also stores information about vibrations for various haptic patterns associated with a pencil, a brush, a marker pen, etc.

To allow the user to change the line thickness of the selected pen, an input window 1240 is displayed in steps S1118 and S1120. The input window 1240 may be provided separately or upon selection of the size menu 1217. The line thickness may increase by moving a thickness option 1241 to the right in the input window 1240 and the line thickness may decrease by moving the thickness option 1241 to the left in the input window 1240.

A control signal representing a haptic pattern for the selected line thickness is transmitted and the selected line thickness is applied to the selected pen for the input unit in step S1122. As described above, when a pen type is selected and a line thickness is selected for the pen type, the controller 110 transmits control signals representing haptic patterns predetermined for the selected pen type and the selected line thickness to the input unit 1230. The input unit 1230 vibrates in correspondence with the predetermined haptic patterns by analyzing the received control signals so that the user feels vibrations corresponding to the haptic waveform of the marker pen mode illustrated in FIG. 15E switched from the haptic waveform of the pencil mode illustrated in FIG. 15B.

FIG. 15B is a diagram illustrating the waveform of a haptic pattern preset for pencil as the pen function of an input unit according to an embodiment of the present invention, FIG. 15C is a diagram illustrating the waveform of a haptic pattern preset for brush as the pen function of an input unit according to an embodiment of the present invention, FIG. 15D is a diagram illustrating the waveform of a haptic pattern preset for fountain pen as the pen function of an input unit according to an embodiment of the present invention, FIG. 15E is a diagram illustrating the waveform of a haptic pattern preset for marker pen as the pen function of an input unit according to an embodiment of the present invention, and FIG. 15F is a diagram illustrating the waveform of a haptic pattern preset for ball-point pen as the pen function of an input unit according to an embodiment of the present invention.

Referring to FIG. 15B, the haptic pattern provides vibrations that give a tactile feeling felt from writing with a pencil. When the pen function of the input unit 168 is set to pencil, the vibration device 520 of the input unit 168 has a vibration cycle of about 50 ms. Because the length and time of one stroke is substantially similar across a character sequence, the waveform of the haptic pattern for the pencil function has a short cycle as illustrated in FIG. 15B. More specifically, according to the haptic pattern, vibrations start from a vibration strength corresponding to 1V, last at 50 mV for 100 ms, and return to 1V. This waveform may be repeated aperiodically. Referring to FIG. 15C illustrating the waveform of a haptic pattern for brush as the pen function of the input unit, the waveform has a longer cycle than the waveform illustrated in FIG. 15B. While a pencil is usually used to write, and therefore one pencil stroke is short, one stroke of a brush is relatively long because the brush is usually used for coloring or drawing. Accordingly, a control signal has a longer vibration cycle when using a brush as the pen function of the input unit than a vibration cycle when using a pencil as the pen function of the input unit. Referring to FIG. 15D illustrating the waveform of a haptic pattern for fountain pen as the pen function of the input unit, the waveform has an irregular cycle. Referring to FIG. 15E illustrating the waveform of a haptic pattern for marker pen as the pen function of the input unit, the waveform has a longer cycle that cycles of other pen types. Since a marker pen is generally used to highlight text, a few to tens of character sequences are highlighted with one stroke of the marker pen. As a result, the haptic pattern for the marker pen has a longer cycle than the other pen types. Referring to FIG. 15F illustrating the waveform of a haptic pattern for ball-point pen as the pen function of the input unit, the haptic pattern generates vibrations that simulate a tactile feeling felt from writing with a ball-point pen. As illustrated in FIGS. 15B to 15F, haptic patterns have different waveforms according to the characteristics of pen types applied to the input unit.

Figure 13:
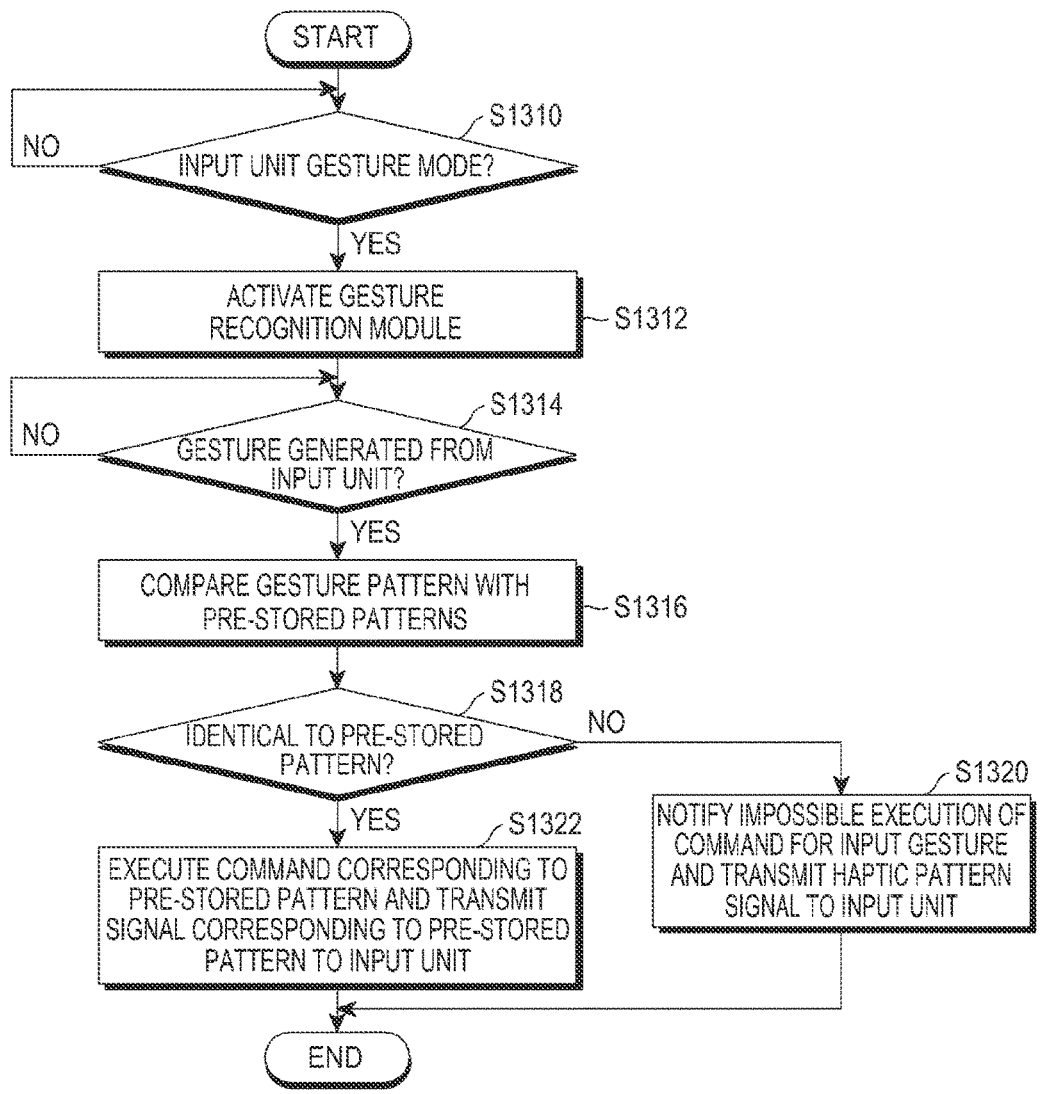
FIG. 13 is a flowchart illustrating an operation of controlling a portable terminal according to an input pattern of an input unit according to an embodiment of the present invention.

FIG. 13 is a flowchart illustrating an operation of controlling a portable terminal according to an input pattern of an input unit according to an embodiment of the present invention and FIGS. 14A to 14D are diagrams illustrating an operation of executing a command corresponding to an input pattern of an input unit according to an embodiment of the present invention. FIG. 15G is a diagram illustrating the waveform of a haptic pattern for control of a portable terminal according to an input pattern of an input unit according to an embodiment of the present invention.

Figure 14A:
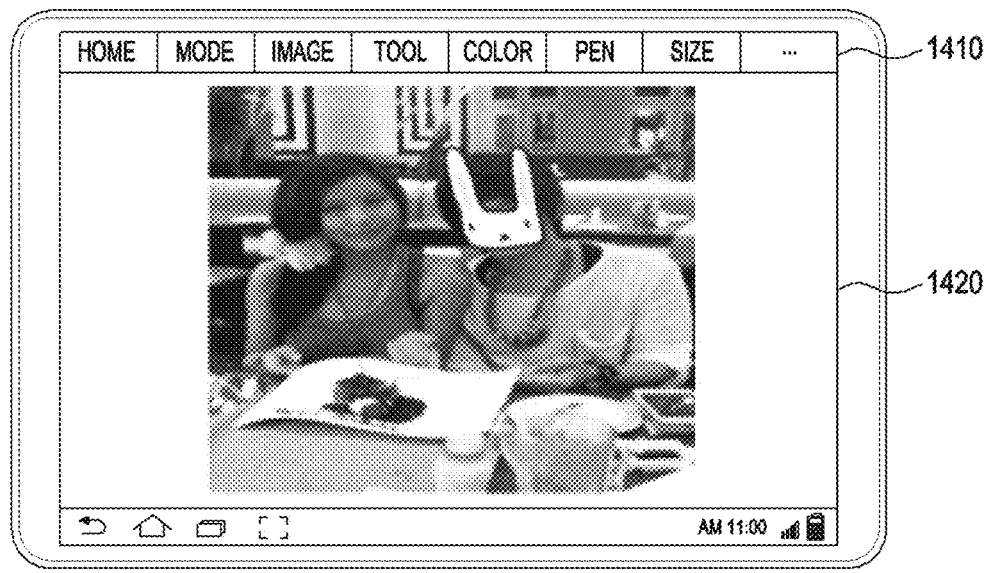
FIG. 14A is a diagram illustrating an image displayed on a touch screen according to an embodiment of the present invention.
Figure 14B:
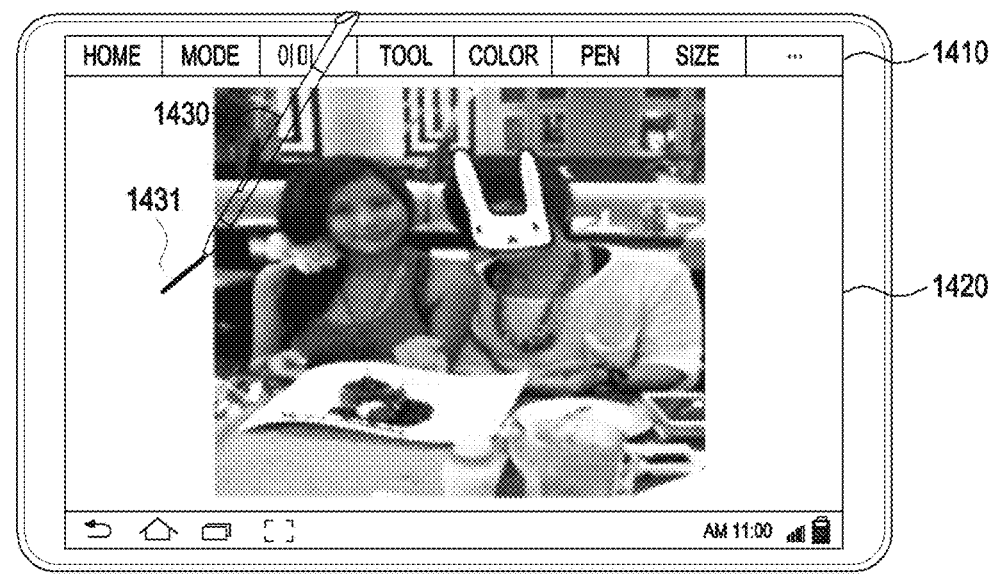
FIG. 14B is a diagram illustrating an operation of inputting an input pattern on a touch screen using an input unit according to an embodiment of the present invention.
Figure 14C:
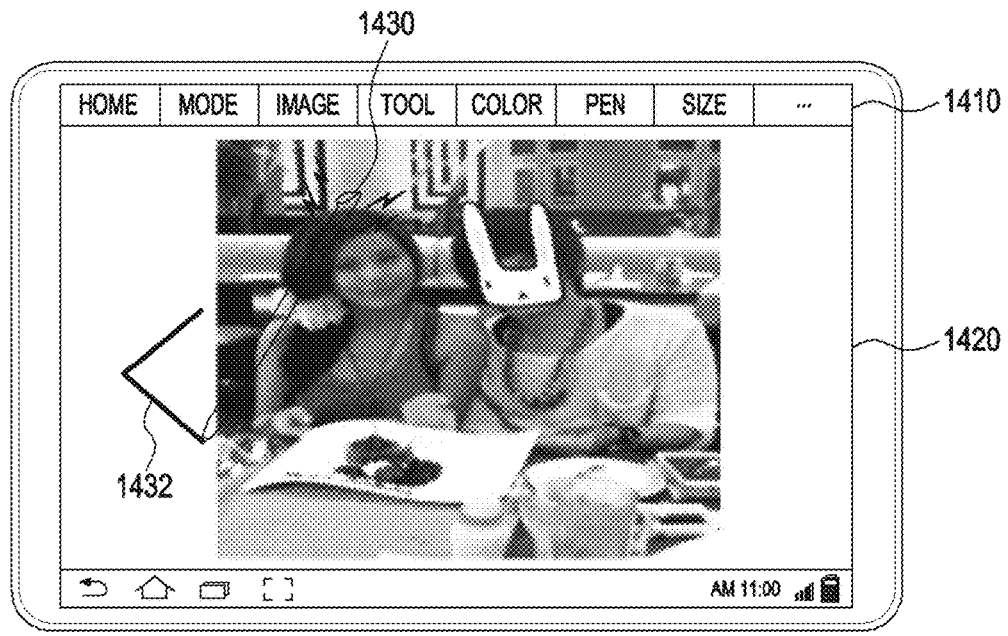
FIG. 14C is a diagram illustrating a completed input pattern on a touch screen, according to an embodiment of the present invention.
Figure 14D:
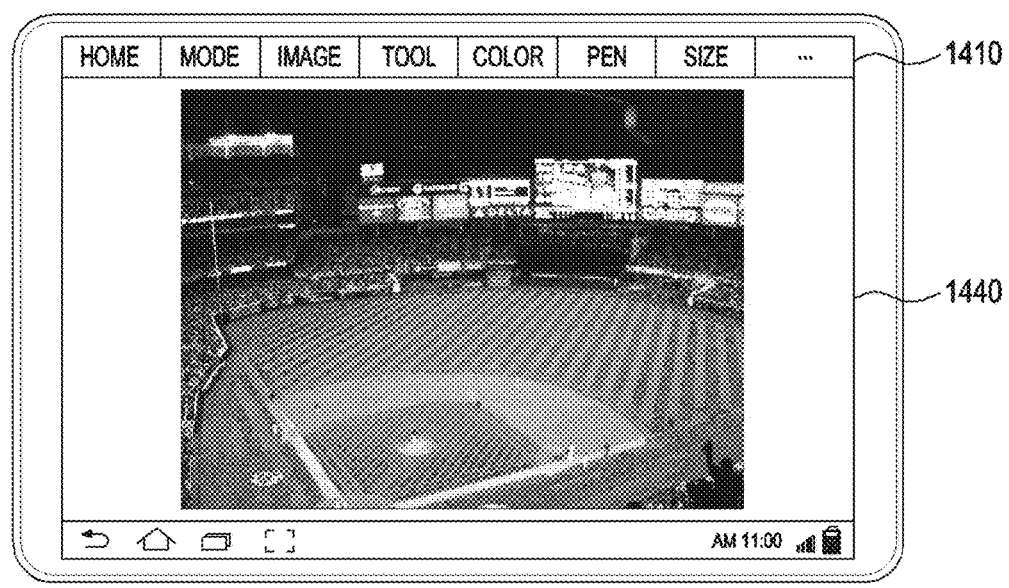
FIG. 14D is a diagram illustrating execution of a command corresponding to an input pattern on a touch screen according to an embodiment of the present invention.

FIG. 14A illustrates an image displayed on a touch screen according to an embodiment of the present invention, FIG. 14B illustrates an operation of inputting an input pattern on a touch screen using an input unit according to an embodiment of the present invention, FIG. 14C illustrates a completed input pattern on a touch screen according to an embodiment of the present invention, and FIG. 14D illustrates execution of a command corresponding to an input pattern of an input unit on a touch screen according to an embodiment of the present invention.

With reference to FIGS. 13 to FIG. 14D, an operation of controlling a portable terminal according to an input pattern of an input unit according to an embodiment of the present invention is described in detail as follows.

When an object is displayed on a screen 1420, a menu bar 1410 is provided according to the attributes of the object. The menu bar 1410 includes various functions such as Home, Mode, Image, Tool, Color, Pen, Size, and the like as illustrated in FIGS. 14A to 14D. Upon selection of a gesture mode for the input unit with the object displayed on the screen 1420, in step S1310, a gesture recognition module is activated, in step S1312. The input unit gesture mode may be provided separately or by the Mode menu of the menu bar 1410. Upon selection of the gesture mode for the input unit 1430, the controller 110 activates the module that recognizes an input pattern of a gesture of the input unit 1430 on the touch screen 190 of the portable terminal 100.

Upon generation of a gesture from the input unit 1430 in step S1314, the input pattern of the gesture is compared with pre-stored patterns in step S1316. As illustrated in FIG. 14B, when the input unit 1430 inputs a gesture pattern 1431 is input on the touch screen, the input pattern 1431 is displayed on the touch screen. As illustrated in FIG. 14C, upon completion of an intended pattern 1432, a preset function corresponding to the pattern 1432 is executed. For example, upon input of the gesture pattern 1432 in FIG. 14C, a previous screen 1440 is displayed. The gesture pattern is determined by the input pattern of the input unit 1430. The memory 175 pre-stores various input patterns corresponding to gestures of the input unit 1430. For example, the memory 175 stores '>' that triggers movement of a current screen to the right or display of a right screen, '<' that triggers movement of a current screen to the left or display of a left screen, '↑' that triggers upward movement of a current screen or display of an upper screen, and '↓' that triggers downward movement of a current screen or display of a lower screen. These gesture patterns are purely and thus it is to be clearly understood that embodiments of the present invention are also applicable to input patterns used to control the portable terminal by a character sequence or initial sound mapped to each function of a menu in an application or input patterns used to control various functions of the portable terminal.

If the gesture pattern does not match to any pre-stored pattern in step S1318, a notification that a command cannot be executed in relation to the input gesture is generated, and a control signal corresponding to a preset haptic pattern is transmitted to the input unit 1430 in step S1320. The controller 110 may notify the user that the command cannot be executed in relation to the input gesture by a pop-up window on the touch screen 1430 or by transmitting a control signal corresponding to a predetermined haptic pattern to the input unit 1430.

However, if the gesture pattern is identical to a pre-stored pattern in step S1318, a command corresponding to the pre-stored pattern is executed, and a signal corresponding to a predetermined haptic pattern is transmitted to the input unit 1430 in step S1322. FIG. 14D illustrates display of a previous screen or image according to the input pattern 1432 applied in FIG. 14C. Upon input of this pattern, the controller 110 executes a command corresponding to the input pattern and transmits, to the input unit 1430, a control signal corresponding to a predetermined haptic pattern. Then, the input unit 1430 vibrates according to the haptic pattern by analyzing the received control signal.

Referring to FIG. 15H, which illustrates an example of the waveform of a haptic pattern for control of a portable terminal according to an input pattern of an input unit, the same or different waveforms may apply to different input patterns of the input unit.

As is apparent from the above description of embodiments of the present invention, when an input unit touches a touch screen of a portable terminal or is located near to the touch screen, the portable terminal transmits a control signal that gives a haptic effect to the input unit. Therefore, the portable terminal simulates various user experiences felt in reality for a user. In addition, as a continuous movement of the input unit on the touch screen is provided, the user can feel a sense of manipulation regarding the touch screen. Further, embodiments of the present invention can support a realistic, natural user interaction environment by giving a haptic effect through the input unit.

Embodiments of the present invention described herein above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the embodiments of the present invention as described above. Alternatively, one or more processors operating in accordance with stored instructions may implement the functions associated with the embodiments of the present invention as described above. Such instructions may be stored on one or more processor readable mediums. Examples of the processor readable mediums include a Read Only Memory (ROM), a Random Access Memory (RAM), Compact-Disc (CD)-ROMs, magnetic tapes, floppy disks, and optical data storage devices. The processor readable mediums can also be distributed over network coupled computer systems so that the instructions are stored and executed in a distributed fashion. Also, functional computer programs, instructions, and instruction segments for accomplishing embodiments of the present invention can be easily construed by programmers skilled in the art to which the present invention pertains.

While the invention has been shown and described with reference to certain embodiments thereof, it will be understood by those skilled in the art that various changes in form and details may be made therein without departing from the spirit and scope of the invention as defined by the appended claims and their equivalents.

What is claimed is:

1. A method for controlling a haptic effect of an input unit in an electronic device, the method comprising:
    displaying, by a processor of the electronic device, at least one object on a touch screen of the electronic device;
    detecting, by the processor, a touch input by the input unit with respect to the object displayed on the touch screen;
    determining, by the processor, a mode for the haptic effect to be provided by the input unit based on the detected touch input of the input unit;
    generating, by the processor, a control signal corresponding to a predetermined haptic pattern based on the determined mode; and
    transmitting, by the processor, the generated control signal to the input unit,
    wherein the predetermined haptic pattern is different according to the mode applied to the displayed object, and
    wherein if the mode is a mode of drawing a contour around the displayed object, displaying a contour in a proceeding direction of the input unit along a virtual contour formed based on brightness of the displayed object.

2. The method of claim 1, further comprising determining and storing haptic patterns corresponding to touch inputs of the input unit.

3. The method of claim 1, wherein the control signal is periodically transmitted to the input unit until movement of the input unit is completed.

4. The method of claim 1, wherein the modes include a first mode of cutting a partial area of the displayed object using the input unit, a second mode of drawing a contour around the displayed object using the input unit, a third mode of controlling the touch screen using the input unit, and a fourth mode of changing a pen type for the input unit.

5. The method of claim 4, wherein the second mode has a haptic pattern that periodically repeats a vibration waveform that starts from a vibration strength of 1.2V, continues at 20 mV for 70 ms, and then returns to the vibration strength of 1.2V.

6. The method of claim 4, wherein the third mode has a haptic pattern that generates a vibration waveform that start from a vibration strength of 1.5V, continues at 20 mV for 150 ms, and then returns to the vibration strength of 1.5V.

7. The method of claim 4, wherein the fourth mode has a haptic pattern that aperiodically repeats a vibration waveform starting from a vibration strength of 1V, lasting at 50 mV for 100 ms, and returning to the vibration strength of 1V.

8. An electronic device for controlling a haptic effect of an input unit, the electronic device comprising:
    a touch screen configured to display at least one object;
    a processor configured to detect a touch input by the input unit with respect to the object displayed on the touch screen, to determine a mode for the haptic effect to be provided by the input unit based on the detected touch input of the input unit and to generate a control signal corresponding to a predetermined haptic pattern based on the determined mode; and
    a transceiver configured to transmit the generated control signal to the input unit,
    wherein the predetermined haptic pattern is different according to the mode applied to the displayed object, and
    if the mode is a mode of drawing a contour around the displayed object, the processor displays a contour in a proceeding direction of the input unit along a virtual contour formed based on brightness of the displayed object.

9. The electronic device of claim 8, further comprising a memory configured to store information about the plurality of vibrations regarding haptic patterns, and pattern information required to execute predetermined commands.

10. The electronic device of claim 8, wherein the processor analyzes movement of the input unit and generates at least one control signal corresponding to a predetermined haptic pattern based on the analysis, while the movement of the input unit continues.

11. The electronic device of claim 8, wherein if the mode is a mode of cutting a partial area of the displayed object, the processor displays a cutting line along a proceeding direction of the input unit, generates a control signal corresponding to a predetermined haptic pattern if the cutting line forms a closed loop, and enlarges an area defined by the closed loop.

12. The electronic device of claim 11, wherein if the closed loop is completed, the processor generates a control signal corresponding to a predetermined haptic pattern.

13. The electronic device of claim 8, further comprising, if the mode is a mode of drawing a contour around the displayed object, calculating a gap between the virtual contour and the contour formed in the proceeding direction of the input unit.

14. The electronic device of claim 13, wherein if the calculated gap is beyond a predetermined range, the processor generates a control signal corresponding to a predetermined haptic pattern.

15. The electronic device of claim 8, wherein if the mode is a mode of controlling the touch screen using the input unit, when an input pattern formed in a proceeding direction of the input unit is identical to a pre-stored pattern, the processor executes a predetermined command corresponding to the pattern and generates a control signal corresponding to the pattern.

16. The electronic device of claim 8, wherein if the mode is a mode of changing a pen type for the input unit, the processor displays an input of the input unit according to a line thickness and color of the changed pen type.

17. A method for providing a haptic effect in an electronic device, comprising:
    storing, by a processor of the electronic device, different haptic patterns to provide a haptic effect to at least one of the electronic device and an input unit according to movement of the input unit;
    determining, by the processor, a mode for the haptic effect to be provided by the electronic device based on a touch input by the input unit with respect to an object displayed on a touch screen of the electronic device;
    generating, by the processor, a control signal corresponding to a predetermined haptic pattern based on the determined mode; and generating, by the processor, vibrations according to the predetermined haptic pattern corresponding to the generated control signal, wherein the predetermined haptic pattern is different according to the mode to be applied to the displayed object, and if the mode is a mode of drawing a contour around the displayed object, displaying a contour in a proceeding direction of the input unit along a virtual contour formed based on brightness of the displayed object.

18. The method of claim 17, further comprising transmitting the control signal corresponding to the predetermined haptic pattern to the input unit, wherein the control signal controls the input unit according to at least one of a vibration length and a vibration cycle of the predetermined haptic pattern.

19. The method of claim 17, further comprising, if movement of the input unit on the touch screen corresponds to one of the stored haptic patterns, controlling the electronic device according to pattern information corresponding to the stored haptic pattern.

20. An input unit for providing a haptic effect, the input unit comprising:
a vibration device;
a short-range communication module configured to receive, from an electronic device, a control signal corresponding to a predetermined haptic pattern based on movement of the input unit with respect to an object displayed on a touch screen of the electronic device; and
a haptic processor configured to control the vibration device to vibrate according to the predetermined haptic pattern by analyzing the control signal,
wherein the control signal controls at least one of activation, deactivation, a vibration cycle, and a vibration strength of the vibration device,
wherein the predetermined haptic pattern is different according to a mode to be applied to the displayed object, and
wherein the control signal is generated if a gap between a virtual contour formed based on the brightness of the object displayed on a touch screen of the electronic device and the contour formed in the proceeding direction of the input unit is beyond a predetermined range.

21. The input unit of claim 20, further comprising a speaker configured to output a sound according to at least one of the vibration cycle and the vibration strength of the vibration device.

22. The input unit of claim 21, wherein the haptic processor controls the speaker to output at least one of a sound corresponding to activation of the vibration device, a sound corresponding to deactivation of the vibration device, and a sound having a volume controlled according to the vibration strength, where the output is maintained for a predetermined time or maintained while the input unit is moving.

23. A method for providing a haptic effect in an input unit, the method comprising:
receiving, by a short-range communication module of the input unit, a control signal corresponding to a predetermined haptic pattern based on movement of the input unit with respect to an object displayed on a touch screen of the electronic device, from an electronic device; and
controlling, by a haptic processor of the input unit, a vibration device to vibrate according to the predetermined haptic pattern by analyzing the control signal,
wherein the control signal controls at least one of activation, deactivation, a vibration cycle, and a vibration strength of the vibration device,
wherein the predetermined haptic pattern is different according to a mode to be applied to the displayed object, and
wherein the control signal is generated if a gap between a virtual contour formed based on the brightness of the object displayed on a touch screen of the electronic device and the contour formed in the proceeding direction of the input unit is beyond a predetermined range.

24. The method of claim 23, wherein the control signal includes a predetermined haptic pattern for at least one of a mode of cutting a partial area of an object displayed on the touch screen using the input unit, a mode of drawing around an object displayed on the touch screen using the input unit, a mode of controlling the touch screen using the input unit, and a mode of changing a pen type for the input unit.

25. The method of claim 17, further comprising varying an electromagnetic induction value of the input unit based on user selection of a button positioned on the input unit.

26. The electronic device of claim 8, wherein the processor is further configured to vary an electromagnetic induction value of the input unit based on user selection of a button positioned on the input unit.

27. An electronic device for controlling a haptic effect of an input unit, the electronic device comprising:
a touch screen configured to display at least one object;
a processor configured to determine a mode for the haptic effect to be provided by the input unit based on a touch input by the input unit with respect to the object displayed on the touch screen and to generate a control signal corresponding to a predetermined haptic pattern based on the determined mode; and
a transceiver configured to transmit the generated control signal to the input unit,
wherein the control signal is generated by using information about a plurality of vibrations regarding haptic patterns and pattern information required to execute predetermined commands according to patterns formed in proceeding directions of the input unit, and
wherein if the mode is a mode of drawing a contour around the displayed object, the processor displays a contour in a proceeding direction of the input unit along a virtual contour formed based on the brightness of the displayed object.

28. A method for providing a haptic effect to a user of an electronic device, the method comprising:
displaying at least one object on a display;
detecting a touch input by an input unit of the electronic device on the display;
determining a mode for the haptic effect based on the detected touch input;
generating a control signal corresponding to a haptic pattern based on the determined mode; and
transmitting the generated control signal to the input unit,
wherein if the mode is a mode of drawing a contour around the displayed object, displaying a contour in a proceeding direction of the input unit along a virtual contour formed based on the brightness of the displayed object.

29. The method of claim 1, wherein the control signal is generated by using information about a plurality of vibrations regarding haptic patterns and pattern information required to execute predetermined commands according to patterns formed in proceeding directions of the input unit.

30. The method of claim 4, wherein the first mode has a haptic pattern corresponding to cutting of a material with scissors, and the haptic pattern periodically repeats a vibration waveform that starts from a vibration strength of 1V, continues at 50 mV for 70 ms, and then returns to the vibration strength of 1V.

31. An electronic device for controlling a haptic effect of an input unit, the electronic device comprising:
- a touch screen configured to display at least one object;
- a processor configured to determine a mode for the haptic effect to be provided by the input unit based on a touch input by the input unit with respect to the object displayed on the touch screen and to generate a control signal corresponding to a predetermined haptic pattern based on the determined mode; and
- a transceiver configured to transmit the generated control signal to the input unit,
- wherein if the mode is a mode of drawing a contour around the displayed object, displaying a contour in a proceeding direction of the input unit along a virtual contour formed based on brightness of the displayed object.

\* \* \* \* \*